US012749023B2

(12) United States Patent
Andrade Costa et al.

(10) Patent No.: US 12,749,023 B2
(45) Date of Patent: Sep. 29, 2026

(54) ANNOTATION OF A MACHINE LEARNING PIPELINE WITH OPERATIONAL SEMANTICS

(71) Applicant: International Business Machines Corporation, Armonk, NY (US)

(72) Inventors: Carlos Henrique Andrade Costa, White Plains, NY (US); Raghu Kiran Ganti, White Plains, NY (US); Mudhakar Srivatsa, White Plains, NY (US); Linsong Chu, White Plains, NY (US); Joshua M. Rosenkranz, White Plains, NY (US); Tuan Minh Hoang Trong, Jackson Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1296 days.

(21) Appl. No.: 17/538,313

(22) Filed: Nov. 30, 2021

(65) Prior Publication Data

US 2023/0169408 A1 Jun. 1, 2023

(51) Int. Cl.
*G06N 20/20* (2019.01)
*G06F 16/901* (2019.01)

(52) U.S. Cl.
CPC ......... *G06N 20/20* (2019.01); *G06F 16/9024* (2019.01)

(58) Field of Classification Search
CPC ............................ G06N 20/20; G06F 16/9024
See application file for complete search history.

(56) References Cited

U.S. PATENT DOCUMENTS

| | | | |
|---|---|---|---|
| 6,370,589 | B1 | 4/2002 | Sieber et al. |
| 8,356,185 | B2 | 1/2013 | Olson et al. |
| 8,537,160 | B2 | 9/2013 | Hargrove et al. |
| 8,928,665 | B2 | 1/2015 | Fonseca et al. |
| 9,053,437 | B2 | 6/2015 | Adler et al. |
| 9,158,797 | B2 | 10/2015 | Stanfill et al. |

(Continued)

FOREIGN PATENT DOCUMENTS

| | | | |
|---|---|---|---|
| CN | 104679807 | A | 6/2015 |
| CN | 105117286 | A | 12/2015 |

(Continued)

OTHER PUBLICATIONS

Patel, Dhaval, et al. "Smart-ml: A system for machine learning model exploration using pipeline graph." 2020 IEEE International Conference on Big Data (Big Data). IEEE, 2020. (Year: 2020).*

(Continued)

*Primary Examiner* — Andrew T Chiusano
(74) *Attorney, Agent, or Firm* — Seed Intellectual Property Law Group LLP

(57) ABSTRACT

A system, computer program product, and method are provided for distributed data workflow semantics. A pipeline, such as a machine learning (ML) pipeline, is implemented over a data flow graph (DFG) with nodes configured to support rich semantics. The rich semantics include two or more operational semantics, and at least one lineage semantic to selectively combine features that trace lineage to a common input object. The lineage semantic is leveraged to associate training and testing data set pairs in cross validation of the trained ML models produced from parallelizing the selection of ML pipelines.

22 Claims, 12 Drawing Sheets

(56) References Cited

U.S. PATENT DOCUMENTS

| | | | |
|---|---|---|---|
| 9,524,366 | B1 | 12/2016 | Watanabe et al. |
| 9,727,438 | B2 | 8/2017 | Buxbaum et al. |
| 9,811,322 | B1 | 11/2017 | Sindelar et al. |
| 10,685,295 | B1 * | 6/2020 | Ross ..................... G06F 9/5083 |
| 10,871,950 | B2 | 12/2020 | De Smet |
| 10,902,121 | B2 | 1/2021 | Chari et al. |
| 11,074,107 | B1 | 7/2021 | Nandakumar |
| 2004/0250157 | A1 | 12/2004 | Barga et al. |
| 2009/0119484 | A1 * | 5/2009 | Mohl ...................... G06F 30/34 712/201 |
| 2009/0235252 | A1 | 9/2009 | Weber et al. |
| 2009/0327196 | A1 | 12/2009 | Studer et al. |
| 2010/0211953 | A1 | 8/2010 | Wakeling et al. |
| 2014/0108438 | A1 | 4/2014 | Duffy et al. |
| 2015/0222730 | A1 | 8/2015 | Gower et al. |
| 2015/0293784 | A1 | 10/2015 | Allen et al. |
| 2016/0103706 | A1 | 4/2016 | Novaes |
| 2016/0117189 | A1 | 4/2016 | Osborne et al. |
| 2018/0189389 | A1 | 7/2018 | Baldini et al. |
| 2019/0073228 | A1 | 3/2019 | Stanfill et al. |
| 2019/0140994 | A1 | 5/2019 | Snider et al. |
| 2019/0229996 | A1 | 7/2019 | Chofleming et al. |
| 2019/0378052 | A1 | 12/2019 | Badhwar |
| 2020/0265324 | A1 | 8/2020 | Ferreira et al. |
| 2021/0065048 | A1 | 3/2021 | Salonidis et al. |
| 2021/0118210 | A1 | 4/2021 | Maruyama et al. |
| 2021/0216905 | A1 | 7/2021 | Floratou et al. |
| 2022/0066905 | A1 * | 3/2022 | Lee ........................ G06V 10/32 |
| 2022/0092471 | A1 * | 3/2022 | Jaeger .................... G06N 20/20 |
| 2022/0138266 | A1 | 5/2022 | Wang et al. |
| 2022/0215260 | A1 | 7/2022 | Dasoulas et al. |
| 2022/0374288 | A1 | 11/2022 | Kibardin et al. |
| 2023/0106416 | A1 | 4/2023 | Gupte et al. |
| 2023/0168923 | A1 | 6/2023 | Ganti et al. |
| 2023/0169354 | A1 | 6/2023 | Srivatsa et al. |

FOREIGN PATENT DOCUMENTS

| | | | |
|---|---|---|---|
| CN | 105843684 | A | 8/2016 |
| CN | 107273193 | A | 10/2017 |
| CN | 109814986 | A | 5/2019 |
| CN | 110275765 | A | 9/2019 |
| CN | 110362315 | A | 10/2019 |
| CN | 111158800 | A | 5/2020 |
| CN | 111176817 | A | 5/2020 |
| CN | 112379995 | A | 2/2021 |
| CN | 112463346 | A | 3/2021 |

OTHER PUBLICATIONS

Sparks, Evan R., et al. “Keystoneml: Optimizing pipelines for large-scale advanced analytics.” 2017 IEEE 33rd international conference on data engineering (ICDE). IEEE, 2017. (Year: 2017).*

Shang, Zeyuan, et al. “Democratizing data science through interactive curation of ml pipelines.” Proceedings of the 2019 international conference on management of data. 2019. (Year: 2019).*

Grafberger et al. Lightweight Inspection of Data Preprocessing in Native Machine Learning Pipelines, Jan. 2021 (Year: 2021), 8 pages.

Phani et al., “LIMA: Fine-grained Lineage Tracing and Reuse in Machine Learning Systems” (Year: 2021), 14 pages.

Zhang et al., “Diagnosing Machine Learning Pipelines with Fine-grained Lineage”, 2017, 11 pages.

Betancourt, Frank, et al., “openDIEL: A Parallel Workflow Engine and Data Analytics Framework,” Proceedings of the Practice and Experience in Advanced Research Computing on Rise of the Machines (learning), 2019, pp. 1-7.

List of IBM Patents or Applications Treated as Related, Nov. 2021.

Nikitin, Nikolay O., et al., “Automated Evolutionary Approach for the Design of Composite Machine Learning Pipelines,” arXiv preprint arXiv:2106.15397, 2021, 18 pages.

Phani, Arnab, et al., “LIMA: Fine-grained Lineage Tracing and Reuse in Machine Learning Systems,” Proceedings of the 2021 International Conference on Management of Data, pp. 1426-1439, 2021.

* cited by examiner

ANNOTATION OF A MACHINE LEARNING PIPELINE WITH OPERATIONAL SEMANTICS

BACKGROUND

The present embodiments relate to a computer system, computer program product, and a computer-implemented method to encode a representation of a machine learning pipeline. More specifically, the embodiments are directed to annotating the pipeline representation with operational semantics and one or more lineage semantics, and leveraging the annotated pipeline to support concurrent exploration of a plurality of machine learning models.

A graph is a series of vertexes connected by edges. In a directed graph, the edges are connected so that each edge only goes one way. A directed acyclic graph (DAG) means that the graph is not cyclic, or that it is impossible to start at one point in the graph and traverse the entire graph. Each edge is directed from an earlier edge to a later edge. This is also known as a topological ordering of a graph. Accordingly, the DAG is a directed graph with no directed cycles.

Similar to the DAG, a data flow graph (DFG) shows the flow of data through a program, given a starting data element. In the DFG, nodes represent operations to be applied to data objects, and arcs represent channels for data objects to move from a producing node to a consuming node. Using the DFG, control and data aspects of a program are represented in one integrated model. When data objects are available at input ports of a node and certain conditions are satisfied, the node is said to be enabled. The embodiments shown and described herein are directed to representing a pipeline in a DFG, and exploiting the representation to efficiently and effectively manage complex multi-steps analytics and machine learning pipelines.

SUMMARY

The embodiments disclosed herein include a computer system, computer program product, and computer-implemented method representing a pipeline in a DFG, selectively annotating or receiving annotations, and leveraging the annotations to train and parallelize the selection of ML models. Those embodiments are further described below in the Detailed Description. This Summary is neither intended to identify key features or essential features or concepts of the claimed subject matter nor to be used in any way that would limit the scope of the claimed subject matter.

In one aspect, a computer system is provided with a processor operatively coupled to memory, and an artificial intelligence (AI) platform operatively coupled to the processor. The AI platform is configured with a processing manager and a director configured with functionality to support pipeline representation, and selective annotation of the represented pipeline. The processing manager is configured to pre-process the pipeline as represented in the DFG. The pre-processing includes annotation of a selection of nodes with two or more operational semantics, and selective annotation of at least one node with a lineage semantic. The director is configured to execute the pre-processed pipeline as represented in the annotated DFG with a training data set to concurrently train ML models. The director is further configured to leverage the lineage semantic to associate the training data set(s) with testing data set(s). Application of the training data set(s) generates ML model performance data.

The director is configured to selectively identify and execute one or more of the ML models based on the generated performance data.

In another aspect, a computer program product is provided with a computer readable storage medium having embodied program code. The program code is executable by the processing unit with functionality to support pipeline representation, and selective annotation of the represented pipeline. Program code is configured to pre-process the pipeline as represented in the DFG. The pre-processing includes annotation of a selection of nodes with two or more operational semantics, and selective annotation of at least one node with a lineage semantic. The program code is further configured to execute the pre-processed pipeline as represented in the annotated DFG with a training data set to concurrently train ML models, which includes program code configured to leverage the lineage semantic to associate the training data set(s) with testing data set(s). Application of the training data set(s) generates ML model performance data. The program code is configured to selectively identify and execute one or more of the ML models based on the generated performance data.

In yet another aspect, a method is provided with functionality to support pipeline representation, and selective annotation of the represented pipeline. The method is configured to pre-process the pipeline as represented in the DFG. The pre-processing includes annotation of a selection of nodes with two or more operational semantics, and selective annotation of at least one node with a lineage semantic. The method is configured to execute the pre-processed pipeline as represented in the annotated DFG with a training data set to concurrently train ML models. The method is further configured to leverage the lineage semantic to associate the training data set(s) with testing data set(s). Application of the training data set(s) generates ML model performance data. The method is configured to selectively identify and execute one or more of the ML models based on the generated performance data.

In a further aspect, a method is provided with functionality to support pipeline representation, and machine learning (ML) model training based on the represented pipeline. The method is configured to pre-process the pipeline as represented in a data flow graph (DFG). The pre-processing includes annotating a selection of nodes with two or more operational semantics, and selectively annotating of at least one node with a lineage semantic that is configured to selectively combine features that trace to a common input object. The pre-processed pipeline, as represented in the DFG, is executed with one or more training data sets to concurrently train a plurality of ML models. Thereafter, the lineage semantic is leveraged to associate the trained ML models to a corresponding testing data set, followed by application of the testing data set to a corresponding trained ML model. The testing data set application is configured to generated ML model performance data. One or more of the trained and tested ML models is selectively identified and executed based on the generated performance data.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

Figure 1:
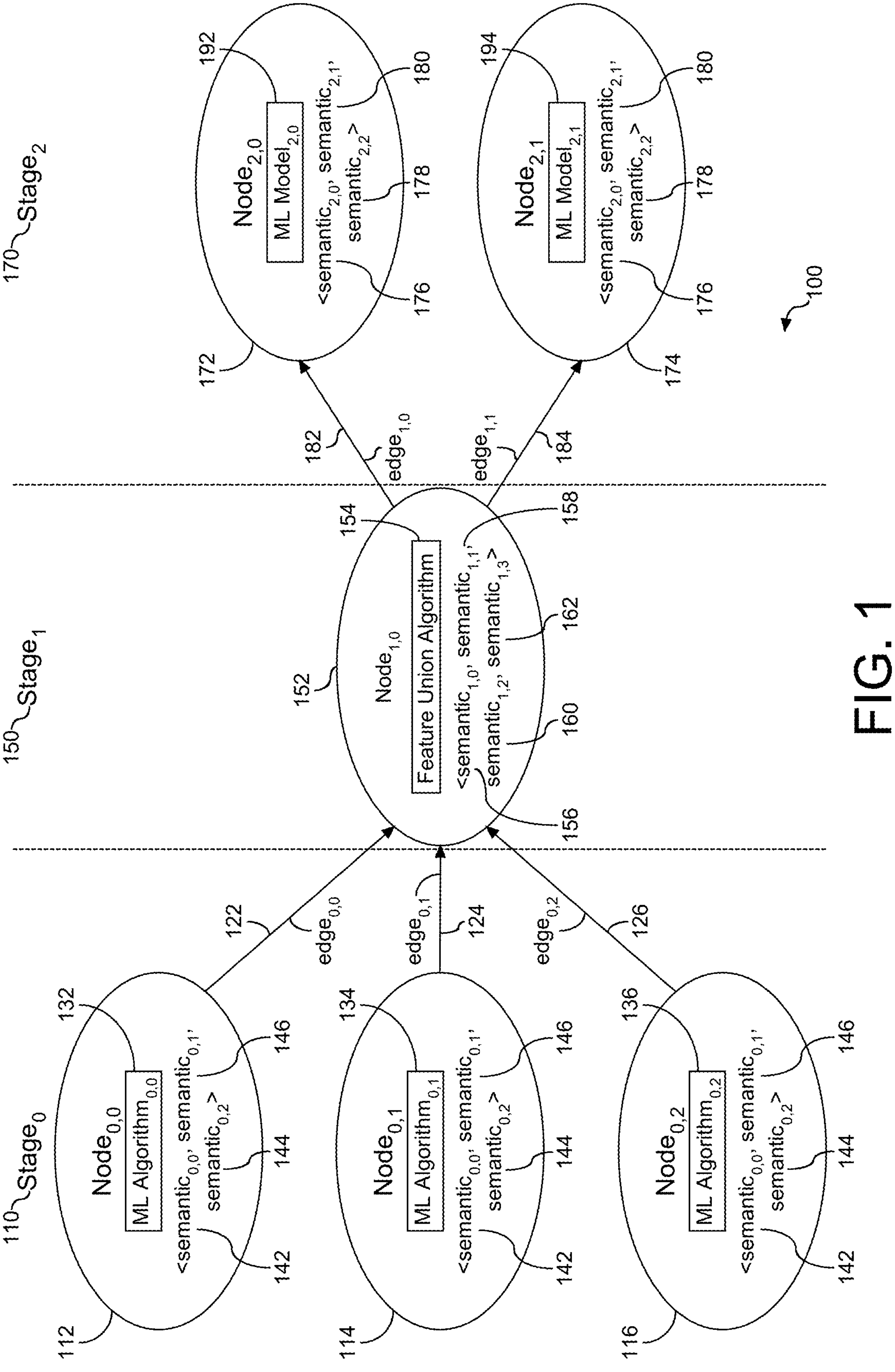
FIG. 1 depicts a block diagram illustrating a block diagram of an example annotated DFG for a ML pipeline to train ML models.

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Artificial Intelligence (AI) relates to the field of computer science directed at computers and computer behavior as related to humans. AI refers to the intelligence when machines, based on information, are able to make decisions, which maximizes the chance of success in a given topic. More specifically, AI is able to learn from a data set to solve problems and provide relevant recommendations. For example, in the field of artificial intelligent computer systems, natural language (NL) systems (such as the IBM Watson® artificially intelligent computer system or other natural language interrogatory answering systems) process NL based on system acquired knowledge.

In the field of AI computer systems, natural language processing (NLP) systems process natural language based on acquired knowledge. NLP is a field of AI that functions as a translation platform between computer and human languages. More specifically, NLP enables computers to analyze and understand human language. Natural Language Understanding (NLU) is a category of NLP that is directed at parsing and translating input according to natural language principles. Examples of such NLP systems are the IBM Watson® artificial intelligent computer system and other natural language question answering systems.

At the core of AI and associated reasoning lies the concept of similarity. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying objects and understanding NL and processing content response to the identification and understanding as well as changes to the structures are extremely difficult at a practical level.

Artificial neural networks (ANNs) are models of the way the nervous system operates. Basic units are referred to as neurons, which are typically organized into layers. The ANN works by simulating a large number of interconnected processing units that resemble abstract versions of neurons. There are typically three parts in an ANN, including an input layer, with units representing input fields, one or more hidden layers, and an output layer, with a unit or units representing target field(s). The units are connected with varying connection strengths or weights, and bias. Input data is presented to the first layer, and values are propagated from each neuron to neurons in the next layer. At a basic level, each layer of the neural network includes one or more operators or functions operatively coupled to output and input. The outputs of evaluating the activation functions of each neuron with provided inputs are referred to herein as activations. Complex neural networks are designed to emulate how the human brain works, so computers can be trained to support poorly defined abstractions and problems where training data is available. ANNs are often used in image recognition, speech, and computer vision applications.

Machine learning (ML), which is a form of AI, utilizes algorithms to learn from data and create foresights based on the data. When creating a ML model, a training data set is designated to train the model, and a testing data set is designated to evaluate the trained model. The training data set, also referred to herein as a training set, is an initial set of data used to teach the ML model how to learn and produce results. Training data can be structured in different ways. For sequential decision trees and those types of algorithms, it would be a set of raw text or alphanumerical data that gets classified or otherwise manipulated. For convolutional neural networks that are directed at image processing and computer vision, the training set is often composed of large numbers of images. The testing data set, also referred to herein as a test set, is a data set that is used to test a ML model after it has been trained on initial training data. In an embodiment, the test set provides a review of the ML model by an unseen data set to confirm that the ML model and associated algorithm was effectively trained. Accordingly, the training set is the material through which the ML model learns to process information, and the test set is the material through which the ML model and associated algorithm is evaluated.

ML is the application of AI through creation of models that can demonstrate learning behavior by performing tasks that are not explicitly programmed. A machine learning (ML) model is the output generated from training the machine learning algorithm with data. After training, when the ML model is provided with an input, the ML model will generate an output. For example, a predictive algorithm will create a predictive ML model, which will generate a prediction from the provided input based on the data that trained the ML model. ML enables ML models to train on data sets before being deployed. After a ML model has been trained, it can be used in real-time to learn from data. There are different types of ML techniques directed at different approaches to processing data, including supervised learning, unsupervised learning, deep learning, and reinforcement learning, hybrid learning problems, such as semi-supervised, self-supervised, and multi-instance learning, statistical inference, such as inductive, deductive, and transductive learning, and learning techniques, such as multi-task, active, online, transfer, and ensemble learning.

The process of training a ML model involves providing or selecting a machine learning algorithm, also referred to as a learning algorithm, with training data from which the model learns, and identifying or selecting a ML technique. The learning algorithm builds a ML models based on the training data, and creates a prediction or decision as output from the build ML model. In an exemplary embodiment, as the ML model receives training data sets, the learning algorithm is fine-tuned for accuracy, which in an embodiment includes determining values for the weights and bias. It is understood in the art that training a ML algorithm to find patterns in data requires large data sets, and as such requires processing power and time.

A machine learning pipeline, hereinafter referred to as a pipeline, is an end-to-end construct that codifies the workflow it takes to produce a ML model. The pipeline consists of multiple, and in an exemplary embodiment, sequential steps that do everything from data extraction and preprocessing to ML model training and deployment. The pipeline includes raw data, features, outputs, the ML model (s) and model parameters, and prediction output.

Integrating AI and ML technologies with cloud-native environments is an increasingly common scenario, driven in part by use of microservices and the need to scale. Developers are faced with the challenge to not only build ML applications, but to ensure that they run well in production in a cloud-native and hybrid cloud environments. As shown and described herein, the DFG is leveraged as a tool to represent the pipeline. The DFG is annotated or subject to annotation with operational semantics to simplify integration, scaling, and acceleration of complex multi-step analytics associated with ML pipelines in a distributed network environment. More specifically, the annotated DFG functions as a framework to simplify integration, scaling, and acceleration of complex multi-step analytics and ML pipelines.

As shown and described herein, the pipeline nodes represented in the DFG are annotated or subject to annotation with operational semantics. In an exemplary embodiment, the aspect of node annotation may be referred to as pipeline pre-processing. Operational semantics, which in an exemplary embodiment do not include logical operators, include input semantics, firing semantics, state semantics, and in an embodiment output semantics. The input semantics refer to input requirements to support a pipeline operation. In an embodiment, the input semantics may be in the form of Or and And. The firing semantics refer to received input and requirements of receipt of one or more objects for processing. In an exemplary embodiment, the firing semantics may be in the form of Any and All, where Any indicates that receipt of any object may enable processing to be initiated, and All indicates that each object must be received to enable processing to initiate. The state semantics shown and described herein refer to a state of the function as it processes incoming object(s). In an exemplary embodiment, the state semantics include No, One Shot, Sequential, and Aggregate. In an embodiment, any other known or future state semantics may be utilized, and as such, the exemplary state semantics shown herein should not be considered limiting. The No state implies that the node is stateless, i.e. the node has no previous data to address. The One Shot state captures nodes that learn standard machine learning models, such as random forest and support vector machine models. In an exemplary embodiment, once these standard ML models are trained they are not updateable. The Sequential state captures nodes that continuously update their state including machine learning models that support partial fit and incremental learning (such as timeseries forecasting algorithms ARIMA, Holt-Winters, BATS, Deep Learning models). The Aggregate state captures nodes whose states can be represented using conflict free replicated data types (CRDTs). The use of the Aggregate state guarantees eventual consistency on states that are commutative and associative, i.e. the eventual state is independent of the order in which the state is updated. The output semantic refers to output from the object processing. In an exemplary embodiment, the output may be presented as a single output object or two or more output objects. For example, an output semantic of Flatten indicates that an output object reference holds a list of objects that must be flattened before further processing in the DFG.

Referring to FIG. 1, a block diagram (100) is provided to illustrate an example annotated DFG for a ML pipeline to train ML models. As shown, there are three stages in the annotated DFG, including a first stage, $stage_0$ (110), a second stage, $stage_1$ (150), and a third stage, $stage_2$ (170). The quantity of stages shown in this example is for descriptive purposes, and should not be considered limiting. The first stage (110) is shown with a plurality of nodes, with each node configured or designated to run a ML algorithm. As shown herein, there are three nodes represented in the first stage (110), and are shown herein as $node_{0,0}$ (112), $node_{0,1}$ (114), and $node_{0,3}$ (116), a single node, $node_{1,0}$ (152) is shown in the second stage (150), and two nodes, $node_{2,0}$ (172) and $node_{2,1}$ (174) are shown in the third stage (170). In the first stage (110), each of the nodes is configured to extract features from received data based on their corresponding and representative ML algorithm. In an embodiment, feature extraction can use one or more known algorithms, including, but not limited to, contour detection on images, Fourier transform on timeseries, etc. The extracted features from each of $node_{0,0}$ (112), $node_{0,1}$ (114), and $node_{0,3}$ (116) is received at the second stage, $stage_1$ (150), via corresponding edges, shown herein as $edge_{0,0}$ (122), $edge_{0,1}$ (124), and $edge_{0,2}$ (126). Each individual edge (122), (124), and (126), communicates features extracted from their respective node to the second stage, $stage_1$ (150), where a union of the extracted features is created, as represented at $node_{1,0}$ (152). In an exemplary embodiment, the edges may represent an object or an object reference. The third stage, $stage_2$ (170), represents the models being trained. In the example shown herein, there are two ML models being trained with each ML model being trained represented in a separate node, e.g. $node_{2,0}$ (172) and $node_{2,1}$ (174). The feature union computed at the second stage, $stage_1$ (150), is communicated to each of the nodes in the third stage, $stage_2$ (170), via corresponding edges, shown herein as $edge_{1,0}$ (182) and $edge_{1,1}$ (184). The feature union data communicated across edges (182) and (184) is used to train the ML models represented in the corresponding nodes (172) and (174), respectively.

The pipeline shown herein demonstrates three stages. In an embodiment, the pipeline may have more or less than three stages, and as such the quantity of stage should not be considered limiting. For example, in an embodiment, the pipeline may have a feature extraction before the first stage, $stage_0$ (110). Similarly, the quantity of nodes shown in each of the stages, including the first stage, $stage_0$ (110), the second stage, $stage_1$ (150), and the third stage, $stage_2$ (170) is for demonstrative purposes and should not be considered limiting.

Each of the nodes in the first stage (110) represents or is configured to represent a ML algorithm. As shown herein $node_{0,0}$ (112) is configured with ML $algorithm_{0,0}$ (132), $node_{0,1}$ (114) is configured with ML $algorithm_{0,1}$ (134), and $node_{0,3}$ (116) is configured with ML $algorithm_{0,2}$ (136). In addition to the algorithm representation, each node is annotated with operational semantics. Each node in the first stage, $stage_0$ (110), is shown with three operational semantics, although the quantity of operational semantic annotations should not be considered limiting. By way of example, $node_{0,0}$ (112) is shown with $semantic_{0,0}$ (142), $semantic_{0,1}$ (144), and $semantic_{0,2}$ (146). $Node_{0,1}$ (114) and $node_{0,2}$ (116) are shown with similar operational semantics. Although the semantics shown in $node_{0,0}$ (112), $node_{0,1}$ (114) and $node_{0,2}$ (116) are the same, in an embodiment, the semantics associated with these nodes may differ and vary. The operational semantics may be in the form of an input combination, a firing combination, a state of the node, or an output condition. Details of the operational semantics and their functionality are described below. In the second stage (150), the $node_{1,0}$ (152) is shown configured with a feature union algorithm (154), and four operational semantics, including $semantic_{1,0}$ (156), $semantic_{1,1}$ (158), $semantic_{1,2}$ (160), and $semantic_{1,3}$ (162). In the example shown herein, a lineage semantic is shown in $node_{1,0}$ (152), with the details of the lineage semantic and its functionality described below. Similar to the first and second stages (110) and (150), respectively, the nodes of the third stage, $stage_2$ (170), are each configured to represent a ML model being trained. As shown herein, $node_{2,0}$ (172) represents ML $model_{2,0}$ (192) and $node_{2,1}$ (174) represents ML $model_{2,1}$ (194). Similar to the nodes of the first and second stages (110) and (150), respectively, the nodes of the third stage (170) are shown herein configured with operational semantics. By way of example, $node_{2,0}$ (172) is shown with $semantic_{2,0}$ (176), $semantic_{2,1}$ (178), and $semantic_{2,2}$ (180), and $node_{2,1}$ (174) is shown with $semantic_{2,0}$ (176), $semantic_{2,1}$ (178), and $semantic_{2,2}$ (180). Although the semantics shown in $node_{2,0}$ (172) and $node_{2,1}$ (174) are the same, in an embodiment, the semantics associated with these nodes may differ and vary. The quantity of operational semantics shown herein are shown for exemplary purposes, and in an embodiment, the quantity of operational semantics of the individual nodes is not fixed and is configurable.

As shown and described above, each of the nodes represented in the pipeline may be configured with operational semantic annotations, including an annotation referred to as Lineage_And. This annotation combines output produced from object or object references on incoming nodes from a prior stage, with the combination joining features that can trace lineage to a common object. In an exemplary embodiment, the Lineage_And annotation ensures that the joined features are from the same class of data. By annotating $node_{1,0}$ (152) with the Lineage_And semantic, the feature union functionality combines features on the same input object from each of the nodes in the first stage communicated across $edge_{0,0}$ (122), $edge_{0,1}$ (124), and $edge_{0,2}$ (126). For example, objects A and B are received as input to the first stage, $stage_0$ (110), with objects $A_0$ and $A_1$ representing features extracted from object A by one of the nodes in the first stage (110), and objects $B_0$ and $B_1$ representing features extracted from object B by one of the nodes in the first stage (110). Features $A_0$ and $A_1$ can be traced back to common object A, and features $B_0$ and $B_1$ can be traced back to common object B. An And annotation with the feature union node in the second stage, $stage_1$ (150), would result in four combinations of the extracted features, including $\{A_0,B_0\}$, $\{A_0,B_1\}$, $\{A_1,B_0\}$, and $\{A_1,B_1\}$. Using the Lineage_And annotation example with the feature union node in the second stage, $stage_1$ (150), the union results in two combinations of objects, including $\{A_0, A_1\}$ and $\{B_0, B_1\}$, where objects $A_0$ and $A_1$ trace their lineage to object A and objects $B_0$ and $B_1$ trace their lineage to object B. Accordingly, the Lineage_And annotation combines objects or object references that traces their respective lineage to a common object.

Figure 2:
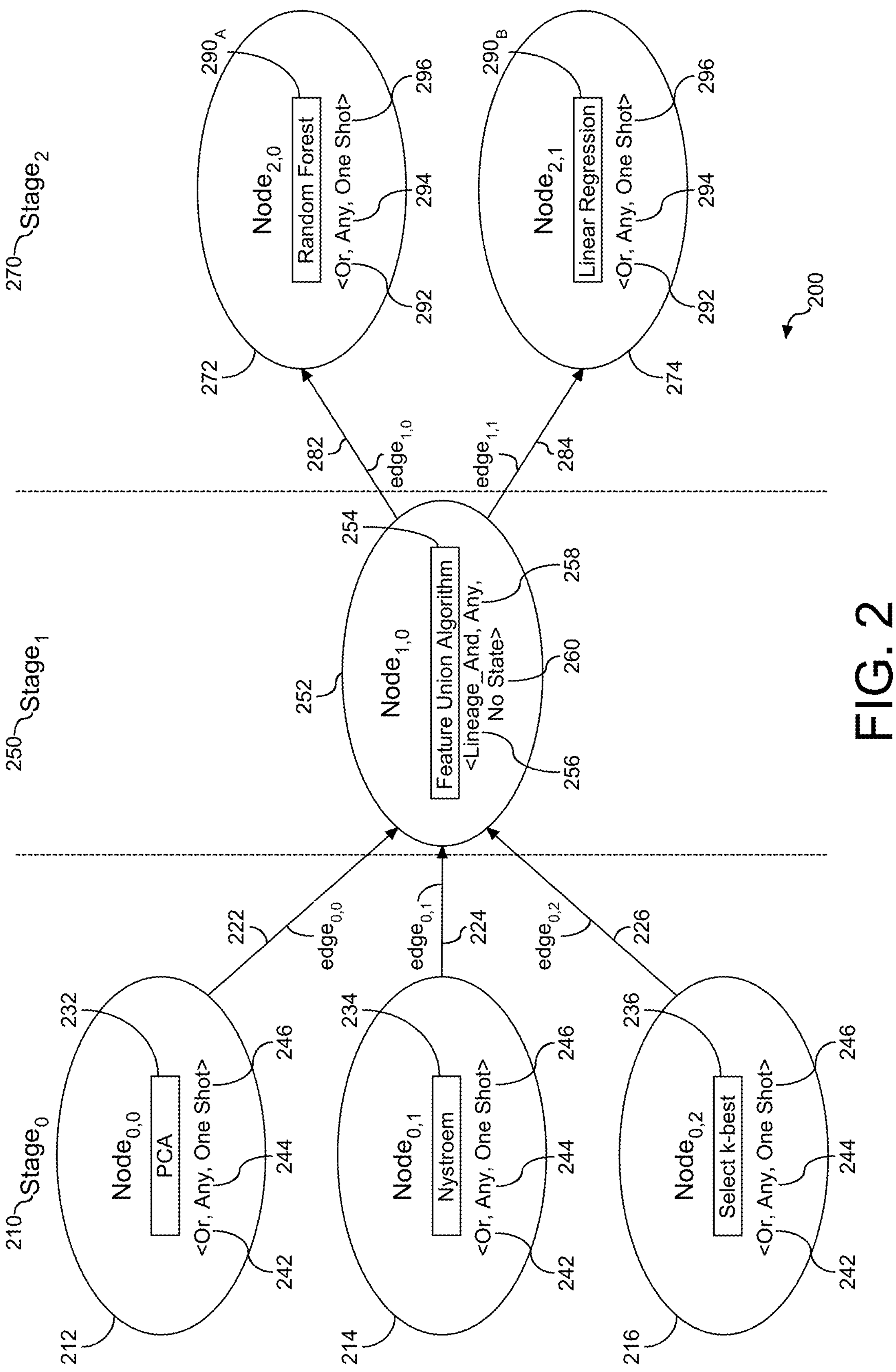
FIG. 2 depicts a block diagram to illustrate an example annotated DFG for training a ML pipeline.

Referring to FIG. 2, a block diagram (200) is provided to illustrate an example annotated DFG for training a ML pipeline. As shown in the example, the annotate DFG is shown with three stages, shown herein as $stage_0$ (210), $stage_1$ (250), and $stage_2$ (270). Although only three stages are shown in the annotated DFG, this quantity is for exemplary purposes and should not be considered limiting. The first stage, $stage_0$ (210), is shown with three nodes, including a first node, $node_{0,0}$ (212), a second node, $node_{0,1}$ (214), and a third node, $node_{0,2}$ (216). Each node in the first stage (210) is individually configured or designated to run a ML algorithm. By way of example, the first node (212) is configured to run a first ML algorithm (232), the second node (214) is configured to run a second ML algorithm (234), and the third node (216) is configured to run a third ML algorithm (236). Examples of the first, second, and third ML algorithms shown herein include, but are not limited to Principal Component Analysis (PCA), Nystroem, and Select k-best. In addition to the ML algorithm configuration, each of the nodes in the first stage (210) is shown with operational semantic annotations. More specifically, each of the first, second, and third nodes, (212), (214), and (216) is shown with three operational semantics, shown herein as Or, Any, and One Shot, (242), (244), and (246), respectively. Although the operational semantics in each of the nodes of the first stage (210) are the same in quantity and category, this aspect should not be considered limiting. In an embodiment, for each node the quantity and category of operational semantic annotations may vary, and as such the quantity and categories shown herein should not be considered limiting.

The operational semantics of a respective node in the first stage (210) dictates how the ML algorithm assigned to that node will function on a given input. By way of example, an input annotation Or indicates that the function is applied to only one input object of two or more input objects, and firing annotation Any indicates that the ML algorithm can execute as long as one input from the edges has been received. In another example, an And input annotation indicates that the corresponding ML algorithm needs at least one input object from every incoming edge, and the Any annotation indicates that the ML algorithm can execute as long as one input object from the edges has been received. Accordingly, the operational semantics assigned to the nodes represented in the pipeline logically dictate when operation of the node can execute.

Each node in the first stage, $stage_0$ (210), is shown with an edge to communicate output from the ML algorithm to the second stage, $stage_1$ (250). As shown herein, the first node (212) is shown with a first edge, $edge_{0,0}$, (222), the second node (214) is shown with a second edge, $edge_{0,1}$, (224), and the third node (216) is shown with a third edge, $edge_{0,2}$, (226). Each of the first, second, and third edges (222), (224), and (226), respectively, communicate output from the ML algorithm represented in the respective node to the second stage. In the second stage (250), the $node_{1,0}$ (252) is shown configured with a feature union algorithm (254), and three operational semantics, shown herein as Lineage_And (256), Any (258), and No State (260). The functionality of the second stage in combination with the assigned operational semantics combines data received across the first, second, and third edges (222), (224), and (226), respectively, from the first stage (210). As further shown herein, the third stage in the pipeline, $stage_2$ (270), represents ML models being trained. In this example, there are two ML models subject to training, with each ML model represented by a different node. As shown by way of example, $node_{2,0}$ (272) represents a Random Forest ML model (290$_A$) and $node_{2,1}$ (274) represents a Linear Regression ML model (290$_B$). Output from the feature union at the second stage, $stage_1$ (250), is communicated to each of the nodes represented in the third stage, $stage_2$ (270). More specifically, $edge_{1,0}$ (282) extends from $node_{1,0}$ (252) to $node_{2,0}$ (272) and $edge_{1,1}$ (284) extends from $node_{1,0}$ (252) to $node_{2,1}$ (274). Similar to the nodes of the first and second stages, (210) and (250), respectively, the nodes of the third stage (270) are also configured to receive annotations of operational semantics. In the example shown herein, $node_{2,0}$ (272) is annotated with three operational semantics, shown herein as Or (292), Any (294), and One Shot (296), and $node_{2,1}$ (274) is also annotated with <Or, Any, One Shot>. The operational semantics of nodes (272) and (274) are for exemplary purposes, and the category and quantity may vary. The ML model represented in the nodes (272) and (274) is trained with data received across corresponding edges (282) and (284), respectively, and according to the operational semantics dictated in the node annotations.

The ML models generated through the pipeline are subject to evaluation. Different ML algorithms search for different trends and patterns. One algorithm may not be optimal across all data set for all use cases. Cross validation (CV) is referred to as an evaluation of whether a particular algorithm is suited for the data and use case. In an embodiment, CV may also be used for hyper parameter tuning and feature selection. For CV, data is split into train and validation sets, as show and described in detail below. To support cross validation in the pipeline, a selection of the nodes represented in the stages may receive a secondary annotation to dictate an order for producing the ML models. In an embodiment, the secondary annotation is different from and in addition to the operational semantic(s). In an embodiment, there are three formats of the secondary annotation, including depth first, breadth first, and early termination. Similarly, in an embodiment, other known or future formats of the secondary annotation may be utilized, and as such, the formats shown and described herein should not be considered limiting. In an embodiment, the execution strategy as reflected in the secondary annotation does not have to be a static annotation, and for example could be provided at the time of DFG execution. The depth first secondary annotation minimizes time to produce a first ML model during training by evaluating nodes in the pipeline with the secondary annotation. The breadth first secondary annotation minimizes memory footprint for producing the ML models during training, and the early termination secondary annotation directs termination of the ML model production based on homogeneity of the ML models being produced by the pipeline.

Figure 3:
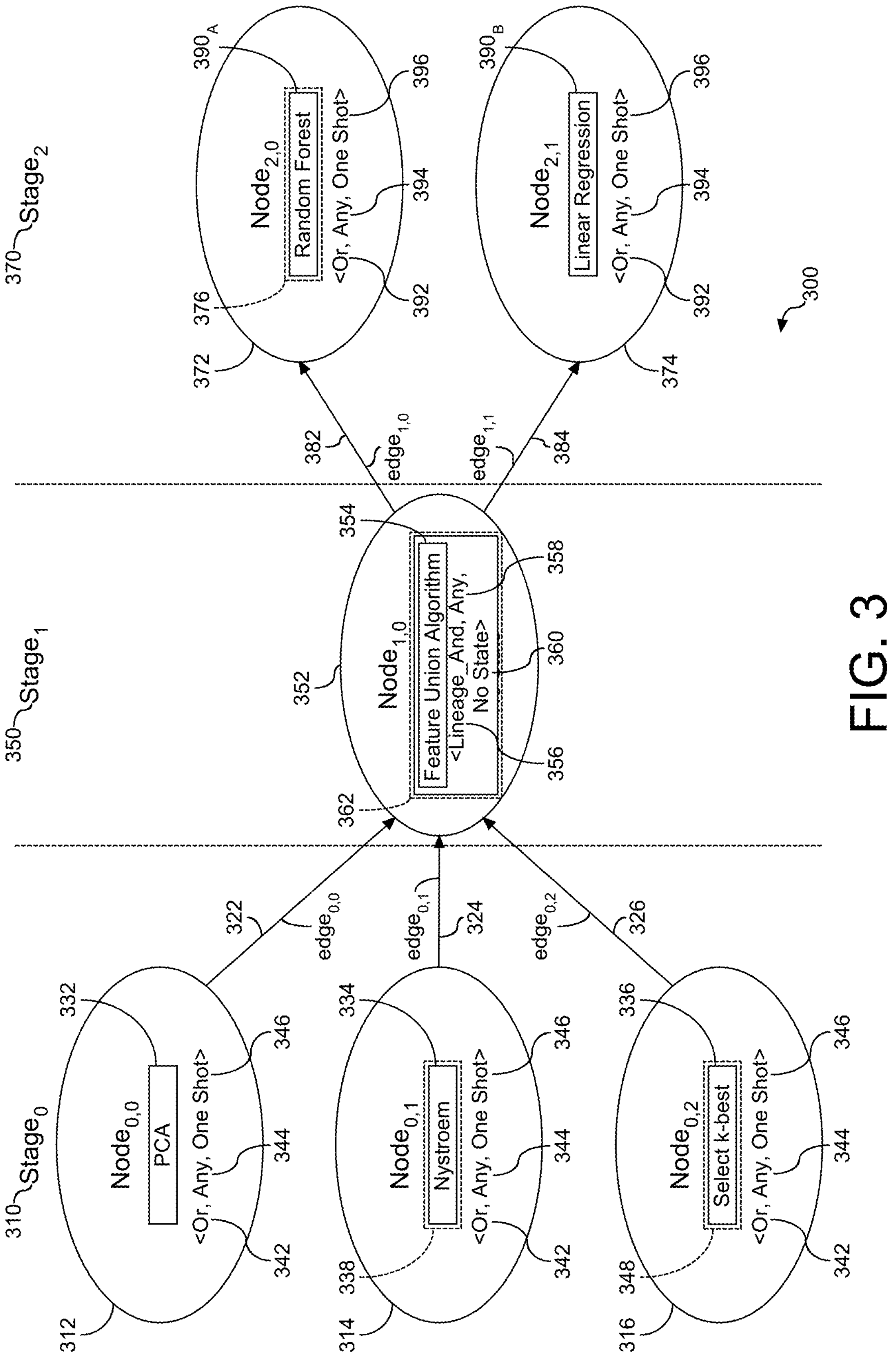
FIG. 3 depicts a block diagram to illustrate an example annotated DFG for training a ML pipeline with secondary annotations to the pipeline of the embodiment of FIG. 2.

Referring to FIG. 3, a block diagram (300) is provided to illustrate an example annotated DFG for training a ML pipeline with secondary annotations to the pipeline of the embodiment of FIG. 2. Parts and features (310), (312), (314), (316), (322), (324), (326), (332), (334), (336), (342), (344), (346), (350), (352), (354), (356), (358), (360), (370), (372), (374), (382), (384), (392), (394), and (396) have the same or similar properties and characteristics of corresponding parts and features (210), (212), (214), (216), (222), (224), (226), (232), (234), (236), (242), (244), (246), (250), (252), (254), (256), (258), (260), (270), (272), (274), (282), (284), (292), (294), and (296), respectively, except as indicated below. In the interest of brevity, the description of components, properties, features, uses, attributes, modifications, variation, etc., associated with those part and features of FIG. 2 is incorporated herein by reference with respect to FIG. 3. Differences between the embodiments are described in greater detail below.

The pipeline represented at (300) is shown with a select subset of the nodes in each stage of the pipeline having a secondary annotation to demonstrate the functionality of the annotations to support a CV depth first search. As shown herein by way of example, $node_{0,1}$ (314) is shown with secondary annotation (338), $node_{0,2}$ (316) is shown with secondary annotation (348), $node_{1,0}$ (352) is shown with secondary annotation (362), and $node_{2,0}$ (372) is shown with secondary annotation (376). The format shown herein for the secondary annotations is an example format, and in an embodiment, other known or future formats for the secondary annotations may be provided. Similarly, in an embodiment, the secondary annotation(s) may be provided as an input during DFG execution. In the example shown herein, the secondary annotations (338), (348), (362) and (376) are illustrated in the form of boxes to illustrate the designation of the respective elements as having a secondary annotation. The secondary annotations (338), (348), (362), and (376) are each in addition to the exemplary annotations of the pipeline nodes, e.g. (342), (344), (346), (356), (358), (360), (392), (394), and (396). Using the secondary annotations (338), (348), (362) and (376), a minimal subset of the nodes as identified by the attached secondary annotations are evaluated to train the Random Forest ML model using a feature union on PCA, Nystroem, and Select k-best.

Figure 4:
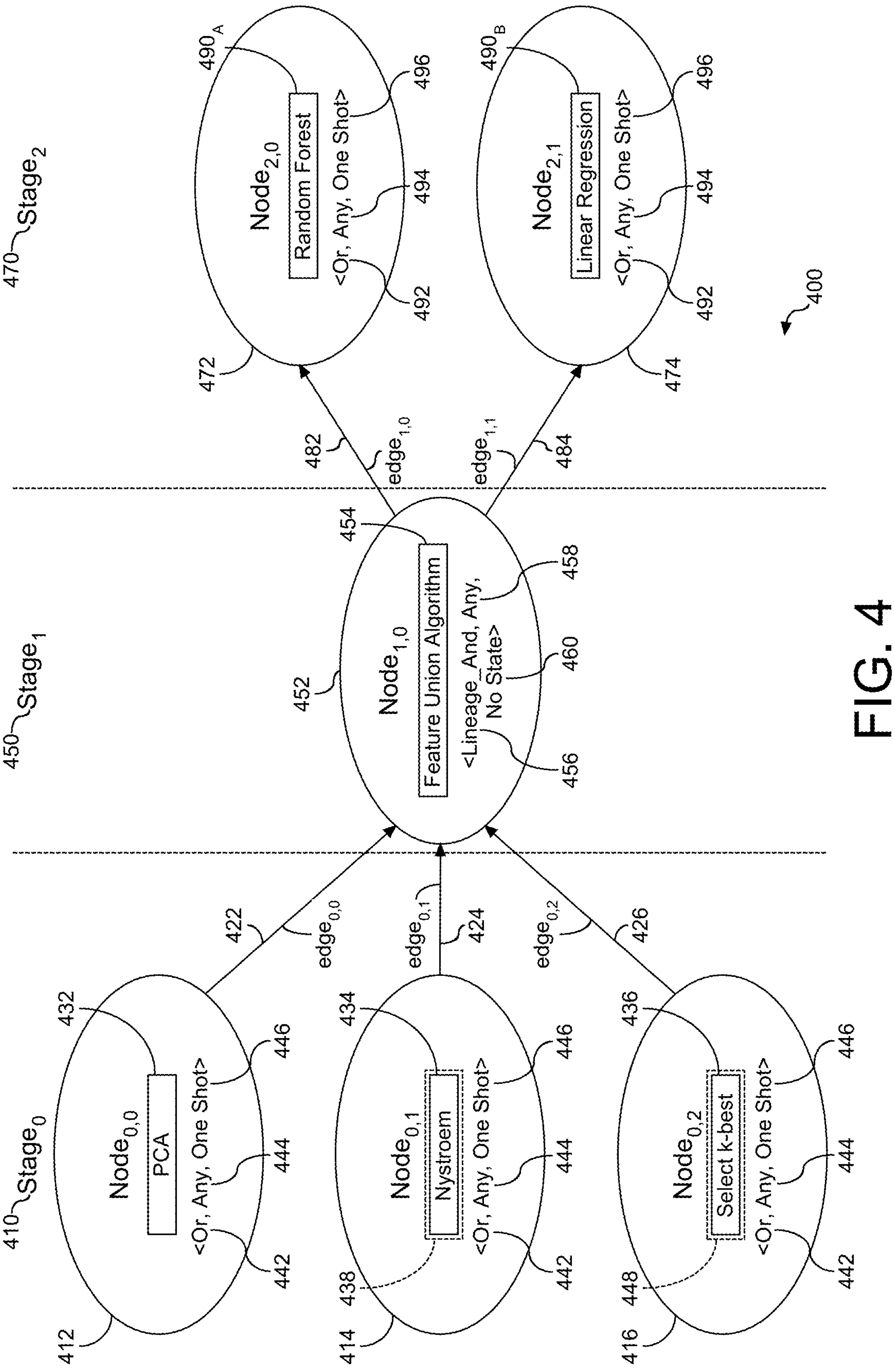
FIG. 4 depicts a block diagram to illustrate an example annotated DFG for training a ML pipeline with secondary annotations to the pipeline of the embodiment of FIG. 2 to support a CV breadth first search.

Referring to FIG. 4, a block diagram (400) is provided to illustrate an example annotated DFG for training a ML pipeline with secondary annotations to the pipeline of the embodiment of FIG. 2 to support a CV breadth first search.

Parts and features (410), (412), (414), (416), (422), (424), (426), (432), (434), (436), (442), (444), (446), (450), (452), (454), (456), (458), (460), (470), (472), (474), (482), (484), (492), (494), and (496) have the same or similar properties and characteristics of corresponding parts and features (210), (212), (214), (216), (222), (224), (226), (232), (234), (236), (242), (244), (246), (250), (252), (254), (256), (258), (260), (270), (272), (274), (282), (284), (292), (294), and (296), respectively, except as indicated below. In the interest of brevity, the description of components, properties, features, uses, attributes, modifications, variation, etc., associated with those part and features of FIG. 2 is incorporated herein by reference with respect to FIG. 4. Differences between the embodiments are described in greater detail below.

The pipeline represented at (400) is shown with a select subset of the nodes in the first stage, $stage_0$ (410), of the pipeline having a secondary annotation to demonstrate the functionality of the annotations to support a CV breadth first search. More specifically, the breadth first search evaluates the pipeline in stages to maximize re-use of output from a prior pipeline stage in a subsequent sequential pipeline stage. As shown herein by way of example, $node_{0,1}$ (414) is shown with secondary annotation (438) and $node_{0,2}$ (416) is shown with secondary annotation (448). The secondary annotations (438) and (448) are each in addition to the exemplary annotations of the pipeline nodes shown in FIG. 3, e.g. (342), (344), (346), (356), (358), (360), (392), (394), and (396). Using the secondary annotations of this example pipeline, the training of the ML algorithm at $node_{0,1}$ (414) and $node_{0,1}$ (416) is evaluated and completed before proceeding to the second stage, $stage_1$ (450). Accordingly, the secondary annotations shown herein maximizes re-use of output from nodes (412) and (414) in the second stage (450) thereby minimizing memory footprint for producing the ML models during training.

Figure 5:
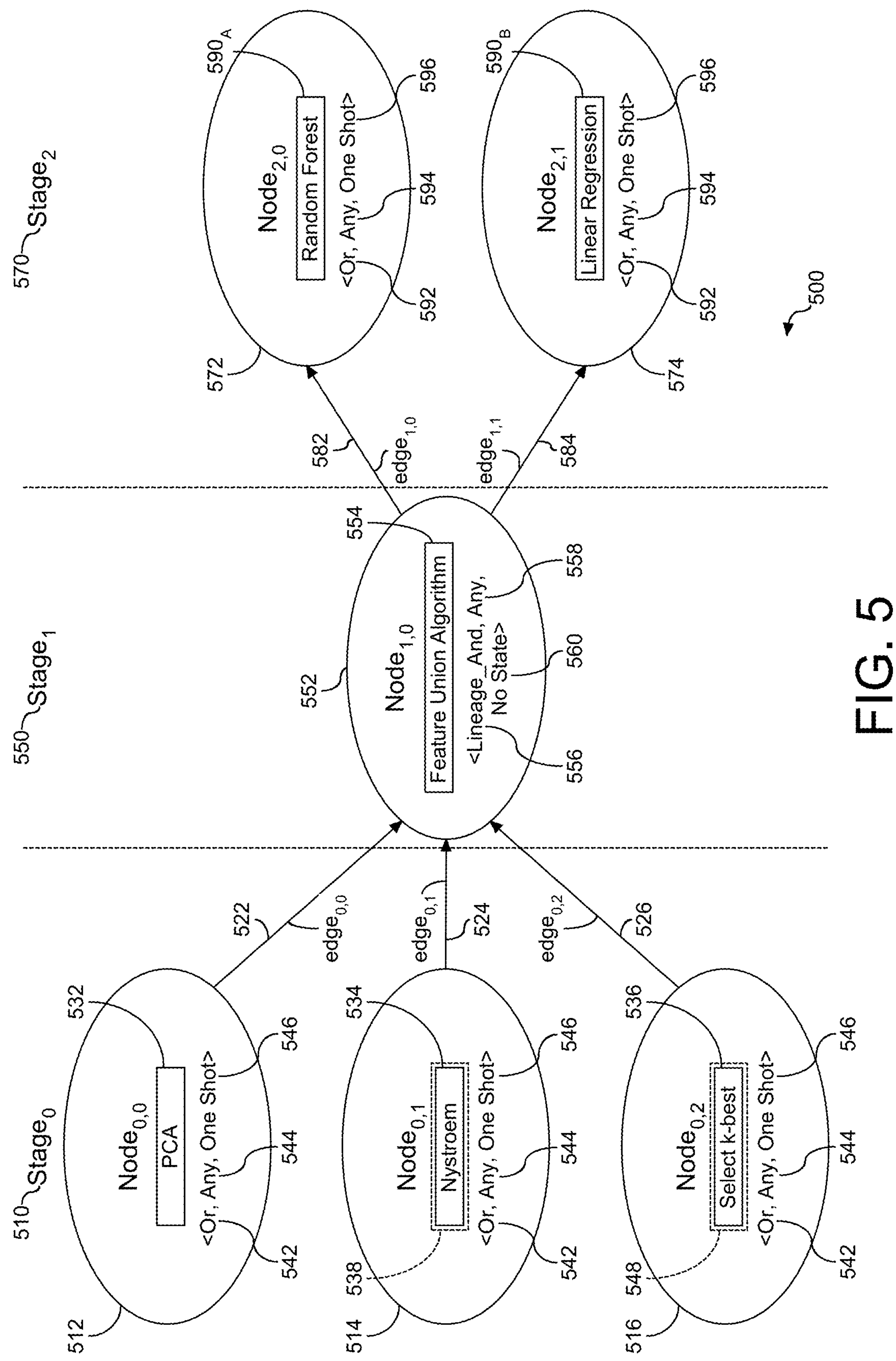
FIG. 5 depicts a block diagram to illustrate an example annotated DFG for training a ML pipeline with secondary annotations to the pipeline of the embodiment of FIG. 2 to support a CV early termination.

Referring to FIG. 5, a block diagram (500) is provided to illustrate an example annotated DFG for training a ML pipeline with secondary annotations to the pipeline of the embodiment of FIG. 2 to support a CV early termination. Parts and features (510), (512), (514), (516), (522), (524), (526), (532), (534), (536), (542), (544), (546), (550), (552), (554), (556), (558), (560), (570), (572), (574), (582), (584), (592), (594), and (596) have the same or similar properties and characteristics of corresponding parts and features (210), (212), (214), (216), (222), (224), (226), (232), (234), (236), (242), (244), (246), (250), (252), (254), (256), (258), (260), (270), (272), (274), (282), (284), (292), (294), and (296), respectively, except as indicated below. In the interest of brevity, the description of components, properties, features, uses, attributes, modifications, variation, etc., associated with those part and features of FIG. 2 is incorporated herein by reference with respect to FIG. 5. Differences between the embodiments are described in greater detail below.

The pipeline represented at (500) is shown with a select subset of the nodes in the first stage, $stage_0$ (510), of the pipeline having a secondary annotation to demonstrate the functionality of the annotations to support a CV early termination. More specifically, the early termination annotation pertains to homogeneity of the ML models being trained. As shown herein by way of example, $node_{0,1}$ (514) is shown with secondary annotation (538), and $node_{0,2}$ (516) is shown with secondary annotation (548). The secondary annotations are each in addition to the exemplary annotations of the pipeline nodes shown in FIG. 2. Using the secondary annotations of this example pipeline, the efficacy of the training of the ML models at the third stage (570) are evaluated with respect to the secondary annotations shown in the first stage (510). If the ML model efficacy from the ML algorithms at $node_{0,1}$ (514) and $node_{0,2}$ (516) are nearly identical, then evaluation of the ML algorithm at $node_{0,0}$ (512) can be skipped. Accordingly, the secondary annotations shown herein provide an avenue for terminating production of the ML models during training.

Figure 6:
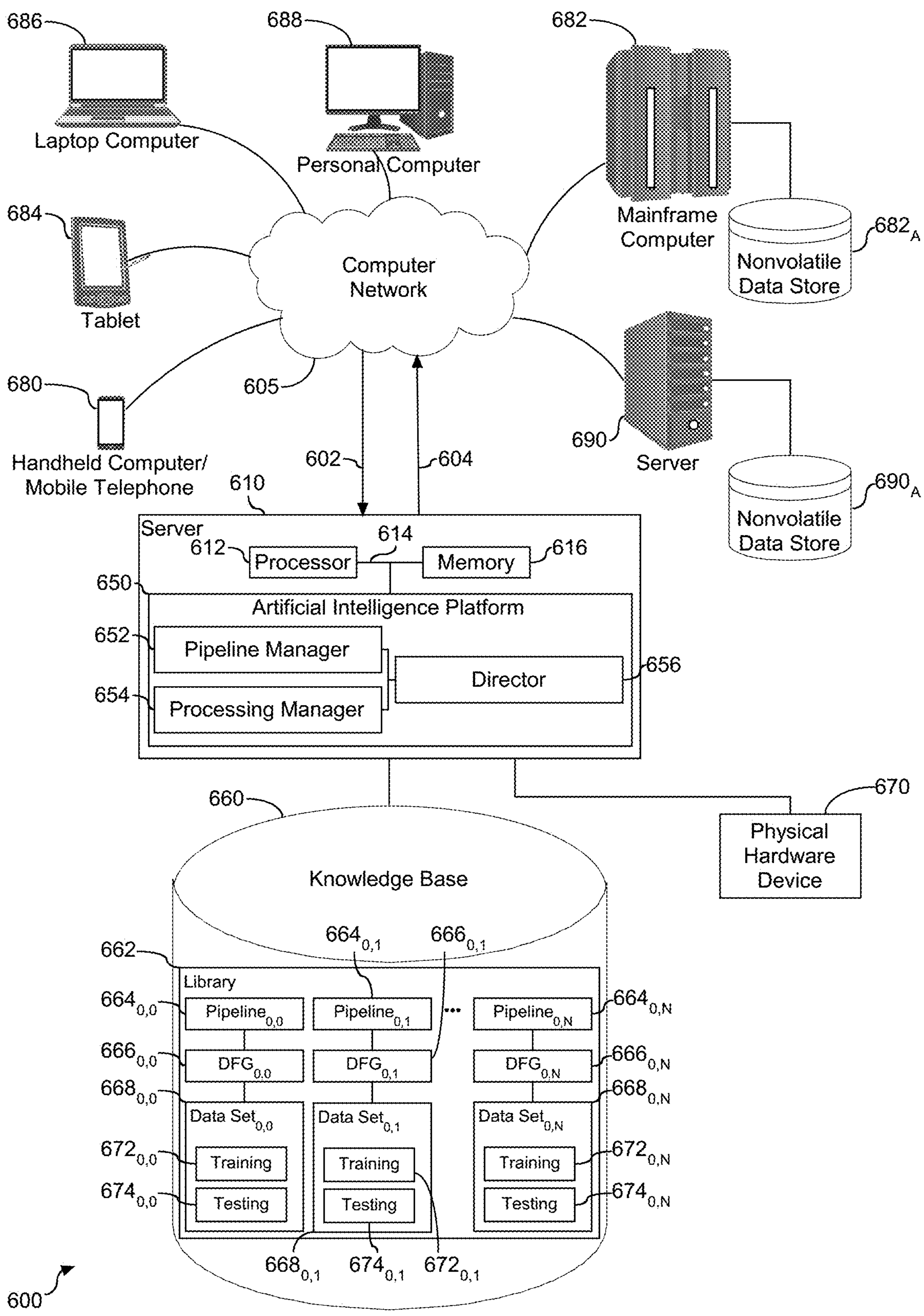
FIG. 6 depicts a computer system with tools to support and enable pipeline representation, annotation, and processing responsive to the representation and annotation.

Referring to FIG. 6, a block diagram (600) is provided to illustrate a computer system with tools to support and enable pipeline representation, annotation, and processing responsive to the representation and annotation. The tools represent a framework to represent a ML pipeline in a data flow graph, and to leverage the ML pipeline for training ML models in a distributed environment, e.g. cloud computing environment. The system and associated tools, as described herein, support pipeline representation and annotation to facilitate ML model training. As shown, a server (610) is provided in communication with a plurality of computing devices (680), (682), (684), (686), (688), and (690) across a network connection (605). The server (610) is configured with a processing unit (612), also referred to herein as a processor, operatively coupled to memory (616) across a bus (614). An artificial intelligence (AI) platform (650) is shown local to the server (610), and operatively coupled to the processing unit (612) and memory (616). As shown, the AI platform (650) contains tools in the form of a pipeline manager (652), a processing manager (654), and a director (656). Together, the tools provide functional support for pipeline management, and more specifically ML model training, over the network (605) from one or more computing devices (680), (682), (684), (686), (688), and (690). The computing devices (680), (682), (684), (686), (688), and (690) communicate with each other and with other devices or components via one or more wires and/or wireless data communication links, where each communication link may comprise one or more of wires, routers, switches, transmitters, receivers, or the like. In this networked arrangement, the server (610) and the network connection (605) enables pipeline representation in the form of a DFG and annotation of the DFG where semantics are programmed into the nodes of the DFG. Other embodiments of the server (610) may be used with components, systems, sub-systems, and/or devices other than those that are depicted herein.

The tools, including the AI platform (650), or in one embodiment, the tools embedded therein including the pipeline manager (652), the processing manager (654), and the director (656), may be configured to receive input from various sources, including but not limited to input from the network (605), and an operatively coupled knowledge base (660). As shown herein, the knowledge base (660) includes a library (662) of ML pipelines, shown herein as $pipeline_{0,0}$ (664$_{0,0}$), $pipeline_{0,1}$ (664$_{0,1}$), . . . , $pipeline_{0,N}$ (664$_{0,N}$). In an embodiment, the ML pipeline may be communicated to the AI platform (650) across the network (605). The quantity of pipelines in the library (662) is for illustrative purposes and should not be considered limiting. In an exemplary embodiment, the represented pipelines have a corresponding DFG, which in an embodiment is annotated or configured to receive one or more annotations. As shown, $pipeline_{0,0}$ (664$_{0,0}$) is associated with $DFG_{0,0}$ (666$_{0,0}$), $pipeline_{0,1}$ (664$_{0,1}$) is associated with $DFG_{0,1}$ (666$_{0,1}$), . . . , and $pipeline_{0,N}$ (664$_{0,N}$) is associated with $DFG_{0,N}$ (666$_{0,N}$). In an embodiment, the DFGs shown in the knowledge base (660) may be annotated or subject to receive one or more annotations. Although each pipeline in the knowledge base (660) is shown with a corresponding DFG, in an exemplary embodiment, one or more of the represented pipelines may not have a corresponding DFG. Similarly, in an exemplary embodiment, the DFG may have different representations based on the annotations, and as such two or more annotated DFGs may be associated with a corresponding pipeline. Similarly, in an exemplary embodiment, the knowledge base (660) may include one or more additional libraries each having one more pipelines therein. As such, the quantity of libraries shown and described herein should not be considered limiting.

The various computing devices (680), (682), (684), (686), (688), and (690) in communication with the network (605) demonstrate access points for the AI platform (650) and the corresponding tools, including the pipeline manager (652), the processing manager (654), and the director (658). Some of the computing devices may include devices for use by the AI platform (650), and in one embodiment the tools (652), (654), and (656) to support pipeline representation, annotation of the representation, processing of the pipeline for training ML models, and leveraging one or more of the training ML models to dynamically generate a control signal to a physical hardware device, a process controlled by software, or a combination of the physical hardware device and the software, associated with output generated by the trained ML model(s). In an exemplary embodiment, the processing manager (654) is configured to insert the node annotation Lineage_And into the DFG representation of the pipeline. The Lineage_And annotation functions to combine objects or object references that trace their respective lineage to a common object. As shown and described herein, the Lineage_And annotation functions to identify, and in an embodiment associate, the training data set to a corresponding and related testing set. Similarly, in one embodiment, the processing manager (654) is configured to insert a secondary annotation into one or more of the nodes in the DFG representing the pipeline. The secondary annotation(s) dictates an order to produce the ML models during the training phase. Examples of the ML model production as dictated by the secondary annotation include, depth first search, breadth first search, and early termination.

By way of example, a physical hardware device (670) is shown operatively coupled to the server (610). In an exemplary embodiment, the control signal selectively controls the operatively coupled physical hardware device (670), or in an embodiment a process controlled by software or a combination of the physical hardware device and the software, with the control signal selectively modifying a physical functional aspect of the device (670). In an embodiment, the device (670) may be a first physical device operatively coupled to an internal component, or in an embodiment a second physical device, and the issued first signal may modify an operating state of the internal component or the second device. For example, the first device (670) may be a product dispenser, and the control signal may modify or control a product dispensing rate to accommodate the rate at which the second device receives the dispensed product. In an embodiment, the director (658) computes a control action based on output generated from execution of the annotated DFG, and constructs or configures the control signal that aligns or is commensurate with the computed control action. In an exemplary embodiment, the control action may be applied as a feedback signal to directly control an event injection to maximize a likelihood of realizing an event or operating state of the device (670).

As shown and described herein, the node annotations provide instruction for processing objects and object references associated with ML model training. Before the training phase, e.g. leveraging the annotation DFG to training ML models, the input data is subject to a split to create two data subsets including a training data set and a testing data set. In an embodiment, the splitting of the input data may be conducted by the director (656). With respect to processing the pipeline with the Lineage_And annotation, the director (650) associates each trained ML model to its training data set and a corresponding testing data set. In an exemplary embodiment, an input data set is assigned to or associated with a corresponding pipeline. As shown herein, input data set ($\mathbf{668}_{0,0}$) is shown separated into a training data set ($\mathbf{672}_{0,0}$) and a testing data set ($\mathbf{674}_{0,0}$). Similarly, input data set ($\mathbf{668}_{0,1}$) is shown separated into training data set ($\mathbf{672}_{0,1}$) and testing data set ($\mathbf{674}_{0,1}$), and input data set ($\mathbf{668}_{0,N}$) is shown separated into training data set ($\mathbf{672}_{0,N}$) and testing data set ($\mathbf{674}_{0,N}$). The testing data sets are applied by the director (656) to the associating trained ML models to capture effectiveness of the model, e.g. evaluate the ML model, or in an embodiment generate output data from the ML model that characterizes model performance.

The network (605) may include local network connections and remote connections in various embodiments, such that the AI platform (650) and the embedded tools (652), (654), and (656) may operate in environments of any size, including local and global, e.g. the Internet, distributed cloud computing environment, etc. Accordingly, the server (610) and the AI platform (650) serve as a front-end system, with the knowledge base (660) and one or more of ML pipelines and associated DFGs serving as the back-end system.

As shown in the knowledge base (660), each pipeline is associated with a DFG. The pipeline manager (652) is configured to represent one or more pipelines as a DFG in which individual nodes of the DFG represent an instance of a mathematical operation and individual nodes represent an object or an object reference. Once created, the DFG is associated with the pipeline and stored in the knowledge base (660). In an embodiment, the pipeline is a ML pipeline. Similarly, in an embodiment, the object reference represented in a node of the DFG is a pointer to a potentially unrealized object. The processing manager (654), shown herein operatively coupled to the pipeline manager (652), is configured to pre-process the pipeline represented in the DFG. The aspect of pipeline pre-processing includes annotation of the nodes or a subset of the nodes represented in the DFG by the processing manager (654), with the annotations including two or more operational semantics. DFG tools are known in the art, and allow nodes to be annotated. As shown and described herein, the node annotations may be in the form of two or more operational semantics, with the operational semantics including an input combination, a firing combination, a state of the node, or an output condition. Examples of the node annotations are shown and described in FIG. 2-5. In addition to the operational semantics, the processing manager (654) is further configured to selectively annotate one or more of the nodes represented in the DFG with a lineage semantic, e.g. Lineage_And, that functions to selectively combine features that trace to a common input object.

In addition to the operational semantic(s) and the lineage semantic, the processing manager (654) is further configured to annotate one or more of the nodes represented in the DFG with a secondary annotation, with the secondary annotation having different functionality than the operational semantics and the lineage semantic. The secondary annotation functions to dictate or control an order in which the ML models are produced during the training phase. The secondary annotation may direct the order to be a depth first search, a breadth first search, or early termination. The depth first search minimizes time to produce a first or first set of ML models during training. The breadth first search minimizes a memory footprint to produce the ML models during training. The early termination is a factor directed to homogeneity of the ML models being produced during training. Accordingly, the processing manager (654) functions to support and enable at least three classes of annotations, including operational semantics, a lineage semantic, and secondary annotations.

As shown, the director (656) embedded as a tool in the AI platform (650) and operatively coupled to the pipeline manager (652) and the processing manager (654). In an embodiment, the director (656) may be operatively coupled to the AI platform (650). The director (656) is configured to execute the pipeline as pre-processed by the processing manager (654). Prior to pipeline execution, or in an embodiment as an initial part of the pipeline execution, the director (656) identifies presence of operational or lineage semantics, and secondary annotations in the DFG as pre-processed by the processing manager (654). The operational semantics are present in the annotations. A node is annotated with a function, $f$, and is also annotated for the operational semantics, such as input semantics, firing semantics, state semantics, and in an embodiment output semantics. The lineage information, also referred to herein as lineage semantics, is created when a node is processed. For example, on processing a node $f$ on input and start state, $f$ (input, start state), produces output and an end state, the provenance holds the following information<$f$, input(s), start state, output, end state>. In a pipeline, output from stage i becomes input to stage i+1. By using the provenance information, the final output at stage i can be connected to input(s) at stage i, which also are output(s) from stage i−1. Recursively, the output from stage i−1 is connected to the input(s) at stage i−1, which is output from stage i−2, etc., until the connection is established between the final output and the input(s) at stage 0. With respect to the example manufacturing environment of the physical device (670), by executing the annotated DFG in view of a scheduling order, the director (656) enables the dispatch of the scheduling order, thereby effectively implementing, and in an embodiment controlling, the scheduling order. When the scheduling order is implemented, the object(s) represented in the DFG are realized, which in a manufacturing environment facilitates or enables materials to be released so that work flows through an associated production line, thereby enabling, supporting, and in an embodiment transforming, the functionality of the physical device (670).

As shown in FIGS. 2-5, the operational or lineage semantics, and secondary annotations in the DFG dictate the manner in which the pre-processed pipeline is executed. The director (656) functions to concurrently or in an embodiment in parallel, train a plurality of ML models based on the selectively annotated DFGs. During execution or the execution phase, the director (656) identifies the presence and location of any operational or lineage semantics, as well as any secondary annotations, and conducts the ML model training in a manner that aligns with the annotations. By way of example and as described above, the secondary annotation, if present, dictates the order in which the ML models are produced during training. With respect to the training phase, the director (656) identifies the presence and location of the lineage semantic, e.g. Lineage_And, and associates the trained ML models to a corresponding test data set, which the director (656) applies to the trained ML models to generate performance data. Subject to the performance data, the director (656) selectively identifies and executes at least one of the trained ML models. The executed ML model(s) generates output data, also referred to herein as output (not show). The director (656) dynamically configures a control signal based on or commensurate with the generated output data, and issues the control signal to an operatively coupled physical hardware device (670). Details of the functionality of the control signal and its interface with the hardware device are described above. Accordingly, the director (656) interfaces with the processing manager (654) to execute the ML pipeline responsive to annotations, and to leverage output from an executed ML model to interface and control the functionality or operability of the physical hardware device (670).

Although shown as being embodied in or integrated with the server (610), the AI platform (650) may be implemented in a separate computing system (e.g., 690) that is connected across the network (605) to the server (610). Similarly, although shown local to the server (610), the tools (652), (654), and (656) may be collectively or individually distributed across the network (605). Wherever embodied, the pipeline manager (652), the processing manager (654), and the director (656) are utilized to support and enable efficient pipeline representation and associated annotation of the representation to effectively and efficiently process and execute a trained and tested ML model.

Types of information handling systems that can utilize server (610) range from small handheld devices, such as a handheld computer/mobile telephone (680) to large mainframe systems, such as a mainframe computer (682). Examples of a handheld computer (680) include personal digital assistants (PDAs), personal entertainment devices, such as MP4 players, portable televisions, and compact disc players. Other examples of information handling systems include a pen or tablet computer (684), a laptop or notebook computer (686), a personal computer system (688) and a server (690). As shown, the various information handling systems can be networked together using computer network (605). Types of computer network (605) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (690) utilizes nonvolatile data store ($690_A$), and mainframe computer (682) utilizes nonvolatile data store ($382_A$). The nonvolatile data store ($382_A$) can be a component that is external to the various information handling systems or can be internal to one of the information handling systems.

Information handling systems may take many forms, some of which are shown in FIG. 6. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 7:
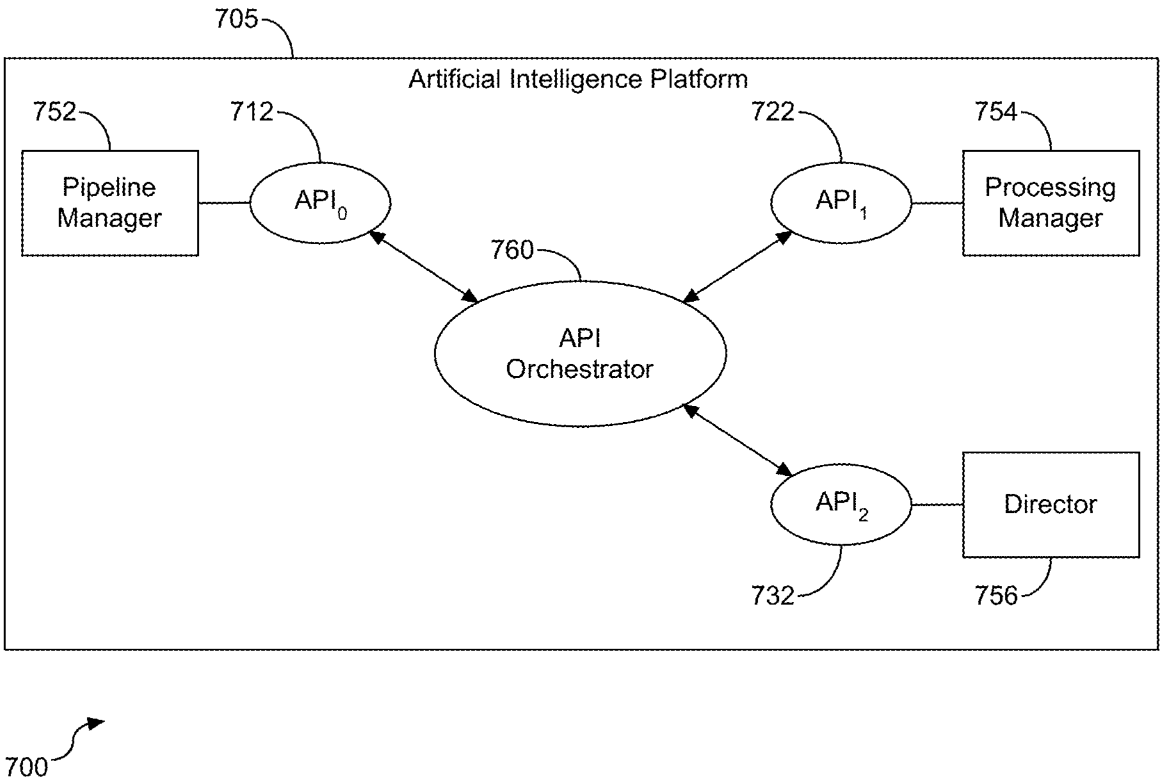
FIG. 7 depicts a block diagram a block diagram to illustrate the tools shown in FIG. 6 and their associated APIs.

An Application Program Interface (API) is understood in the art as a software intermediary between two or more applications. With respect to the embodiments shown and described in FIG. 6, one or more APIs may be utilized to support one or more of the AI platform tools, including the pipeline manager (652), the processing manager (654), and the director (656), and their associated functionality. Referring to FIG. 7, a block diagram (400) is provided illustrating the AI platform tools and their associated APIs. As shown, a plurality of tools are embedded within the AI platform (705), with the tools including the pipeline manager (752) associated with $API_0$ (712), the processing manager (754) associated with $API_1$ (722), and the director (756) associated with $API_2$ (732). Each of the APIs may be implemented in one or more languages and interface specifications.

$API_0$ (712) provides support for representing a pipeline in a DFG, with one or more nodes of the DFG representing an instance of a mathematical operation, and individual edges representing an object or an object reference. $API_1$ (722) provides support for pre-processing the represented pipeline. The pre-processing includes support for node annotations in the form of operational semantics, including an input combination, a firing combination, a state combination, or a combination thereof. The pre-processing also includes support for node annotations directed at lineage, with a corresponding lineage semantic configured to combine features that trace their lineage, e.g. ancestry, to a common input object. $API_2$ (732) provides support for executing the pipeline as represented in the annotated and pre-processed DFG, which includes identification of any annotations, and leveraging those annotations with respect to both ML model training and testing.

As shown, each of the APIs (712), (722), and (732) are operatively coupled to an API orchestrator (760), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 8A:
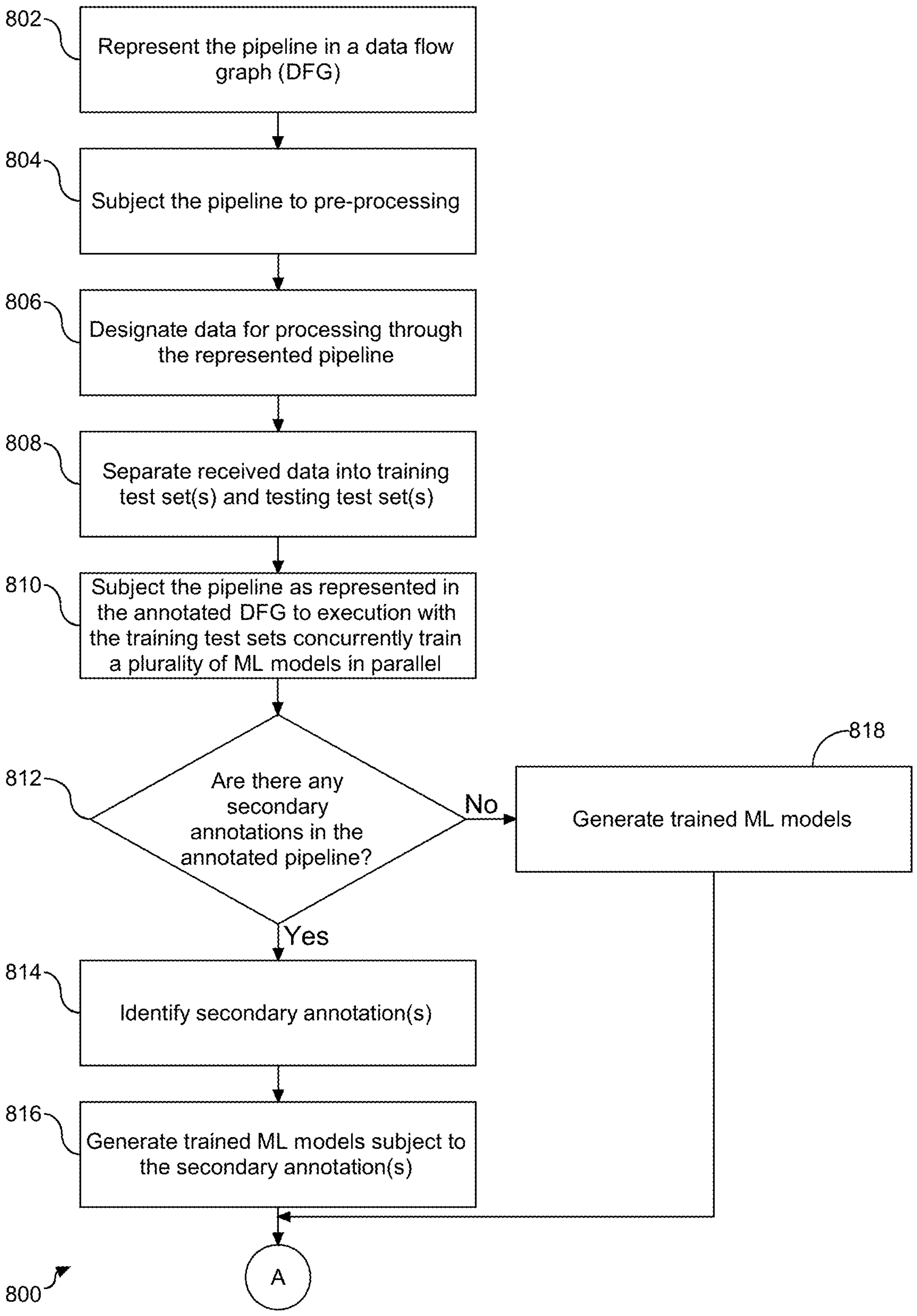
FIGS. 8A and 8B depict a flow chart to illustrate a process for pipeline representation, and pipeline processing responsive to the representation incorporating distributed lineage tracking.
Figure 8B:
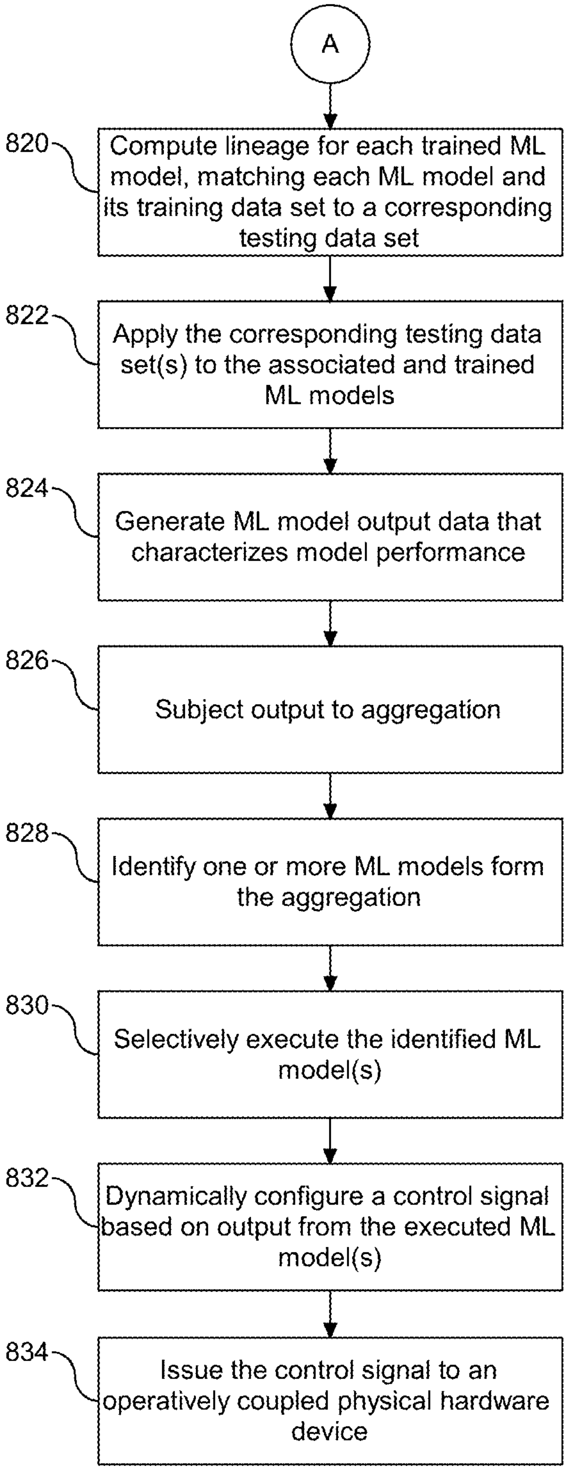

Referring to FIGS. 8A and 8B, a flow chart (800) is provided to illustrate a process for pipeline representation, and pipeline processing responsive to the representation incorporating distributed lineage tracking. As shown, the machine learning pipeline is represented in a data flow graph (DFG) (802). Examples of the representation(s) are shown and described in FIGS. 1-5, with stages, one or more nodes in each stage, and edges joining nodes between adjacent stages. The represented ML pipeline in the DFG is subject to pre-processing (804). As shown in FIGS. 1-5, and in an exemplary embodiment, the pipeline has a minimum of three stages, with a first stage representing training of one or more ML algorithms, a second stage representing a feature union, and a third stage representing ML model training. In an embodiment, one or more nodes in the pipeline is annotated with a lineage semantic, e.g. Lineage_And, to selectively combine features that trace lineage to a common input object at the pre-processing step shown in (804). Input data is designated for processing through the pipeline (806). Before the training phase, the input data is subject to a split into training subsets and testing subsets (808). In an exemplary embodiment, the ML models learn on the training subset and ML model performance is measured using the testing subsets. Accordingly, the initial aspects of pipeline processing are directed to selectively annotating representative nodes in one or more of the pipeline stages, and separating the input data into training data sets and testing data sets.

The pipeline as represented in the annotated DFG is subject to execution with the training subsets to concurrently train a plurality of ML models (810). In an exemplary embodiment, the ML models are trained in parallel. The pipeline execution at step (810) is conducted in parallel for each training subset. In an embodiment, n models are designated in the final pipeline stage, e.g. $stage_2$, and there are k training data sets, such that k×n ML models are subject to training. Each trained ML models produces object output. Based on the example shown herein, and subject to the pipeline node annotation, the k×n ML models produce the k×n output objects. As shown and described above, the secondary annotation directed to Depth First, Breadth First, or Early Termination, if present, may dictate an order for producing the trained ML models. The secondary annotations shown herein are exemplary, and in an embodiment, other known or future secondary annotations may be provided. The secondary annotations are strategies to execute the entire DFG, and in an embodiment are not node annotations. In an embodiment, the secondary annotations are annotations directed to the entirety of the DFG, as opposed to specific nodes in the DFG. Following step (810), an assessment is conducted to determine if there are any secondary annotations presented in the selectively annotated pipeline (812). A positive response to the assessment is followed by identification of the secondary annotation(s) (814), and generating the trained ML models subject to the identified secondary annotations (816). Similarly, a negative response to the assessment at step (814) is followed by generating the trained ML models based on the annotations, also referred to herein as primary annotations, presented in the pipeline (818). Accordingly, as shown herein, the training data sets are processed through the pipeline to concurrently generate trained ML models based on primary annotations, and in an embodiment, secondary annotations.

Following the ML model training, the node annotation directed to the lineage semantic, e.g. Lineage_And, is leveraged for each trained ML model, such that each trained ML model is associated to its training data set and a corresponding testing data set (820). The testing data sets are applied to the associated trained ML models to capture effectiveness of the model (822) to evaluate the ML model, or in an embodiment generate output data from the ML model that characterizes model performance (824). The generated output, also referred to as scores, from the ML models is subject to aggregation (826). Aggregating is directed at a method of building ML models in parallel and averaging their prediction, e.g. output, as a final prediction. As shown in the examples of FIGS. 2-5, the pipeline trains multiple Random Forest models and multiple Linear Regression models in parallel. Following the aggregation step (826), one or more of the trained and tested ML models is identified based on the generated performance data and the aggregation (828), and selectively executed to make a prediction or decision (830). A control signal is dynamically configured based on the prediction or decision from the selectively executed ML model(s) (832), and the configured control signal is issued to an operatively coupled hardware device (834). The issuance of the control signal includes configuring or formatting the control signal based on the constructed output at step (830). The control signal, or in an embodiment a feedback signal, is configured to selectively control or modify an event injection to the operatively coupled hardware device associated with the pipeline. In an exemplary embodiment, the control signal selectively controls a physical state of the operatively coupled hardware device. Accordingly, as shown herein, the secondary lineage semantic provides and supports lineage tracking to associate training and testing data sets in cross validation of the ML models generating through the pipeline represented in the selectively annotated DFG.

The computer system, computer program product, and computer implemented system shown and described herein, implement a ML pipeline over a DFG configured with nodes supporting rich semantics, including an input combination, a firing combination, and a state, or a combination thereof, and a lineage semantic to associated training and testing data set in cross validation of the trained ML models.

As shown and described above in FIG. 6, aspects of the tools (652), (654), and (656) and their associated functionality may be embodied in a computer system/server in a single location, or in an embodiment, may be configured in a cloud based system sharing computing resources. With references to FIG. 9, a block diagram (900) is provided illustrating an example of a computer system/server (902), hereinafter referred to as a host (902) in communication with a cloud based support system, to implement the system and processes described above with respect to FIGS. 1-8. Host (902) is operational with numerous other general purpose or special purpose computing system environments or configurations. Examples of well-known computing systems, environments, and/or configurations that may be suitable for use with host (902) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (902) may be described in the general context of computer system-executable instructions, such as program modules, being executed by a computer system. Generally, program modules may include routines, programs, objects, components, logic, data structures, and so on that perform particular tasks or implement particular abstract data types. Host (902) may be practiced in distributed cloud computing environments (910) where tasks are performed by remote processing devices that are linked through a communications network. In a distributed cloud computing environment, program modules may be located in both local and remote computer system storage media including memory storage devices.

Figure 9:
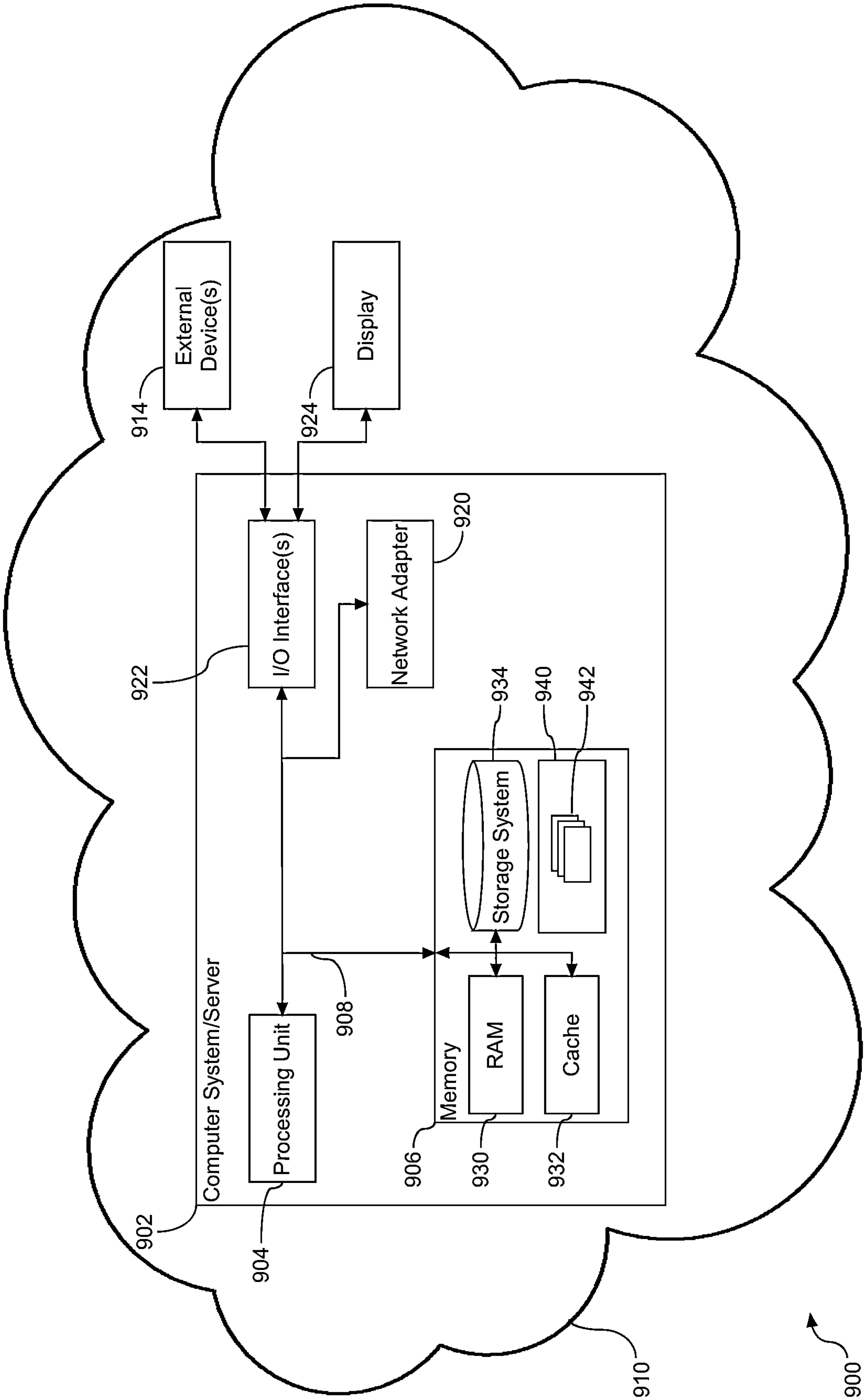
FIG. 9 is a block diagram depicting an example of a computer system/server of a cloud based support system, to implement the system and processes described above with respect to FIGS. 1-5.

As shown in FIG. 9, host (902) is shown in the form of a general-purpose computing device. The components of host (902) may include, but are not limited to, one or more processors or processing units (904), a system memory (906), and a bus (908) that couples various system components including system memory (906) to processor (904). Bus (908) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (902) typically includes a variety of computer system readable media. Such media may be any available media that is accessible by host (902) and it includes both volatile and non-volatile media, removable and non-removable media.

Memory (906) can include computer system readable media in the form of volatile memory, such as random access memory (RAM) (930) and/or cache memory (932). By way of example only, storage system (934) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (908) by one or more data media interfaces.

Program/utility (940), having a set (at least one) of program modules (942), may be stored in memory (906) by way of example, and not limitation, as well as an operating system, one or more application programs, other program modules, and program data. Each of the operating systems, one or more application programs, other program modules, and program data or some combination thereof, may include an implementation of a networking environment. Program modules (942) generally carry out the functions and/or methodologies of pipeline representation, including distributed tracking of object lineage, and processing. For example, the set of program modules (942) may include the modules configured as the tools (652), (654), and (656) described in FIG. 6.

Host (902) may also communicate with one or more external devices (914), such as a keyboard, a pointing device, a sensory input device, a sensory output device, etc.; a display (924); one or more devices that enable a user to interact with host (902); and/or any devices (e.g., network card, modem, etc.) that enable host (902) to communicate with one or more other computing devices. Such communication can occur via Input/Output (I/O) interface(s) (922). Still yet, host (902) can communicate with one or more networks such as a local area network (LAN), a general wide area network (WAN), and/or a public network (e.g., the Internet) via network adapter (920). As depicted, network adapter (920) communicates with the other components of host (902) via bus (908). In one embodiment, a plurality of nodes of a distributed file system (not shown) is in communication with the host (902) via the I/O interface (922) or via the network adapter (920). It should be understood that although not shown, other hardware and/or software components could be used in conjunction with host (902). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (906), including RAM (930), cache (932), and storage system (934), such as a removable storage drive and a hard disk installed in a hard disk drive.

Computer programs (also called computer control logic) are stored in memory (906). Computer programs may also be received via a communication interface, such as network adapter (920). Such computer programs, when run, enable the computer system to perform the features of the present embodiments as discussed herein. In particular, the computer programs, when run, enable the processing unit (904) to perform the features of the computer system. Accordingly, such computer programs represent controllers of the computer system.

In one embodiment, host (902) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 10:
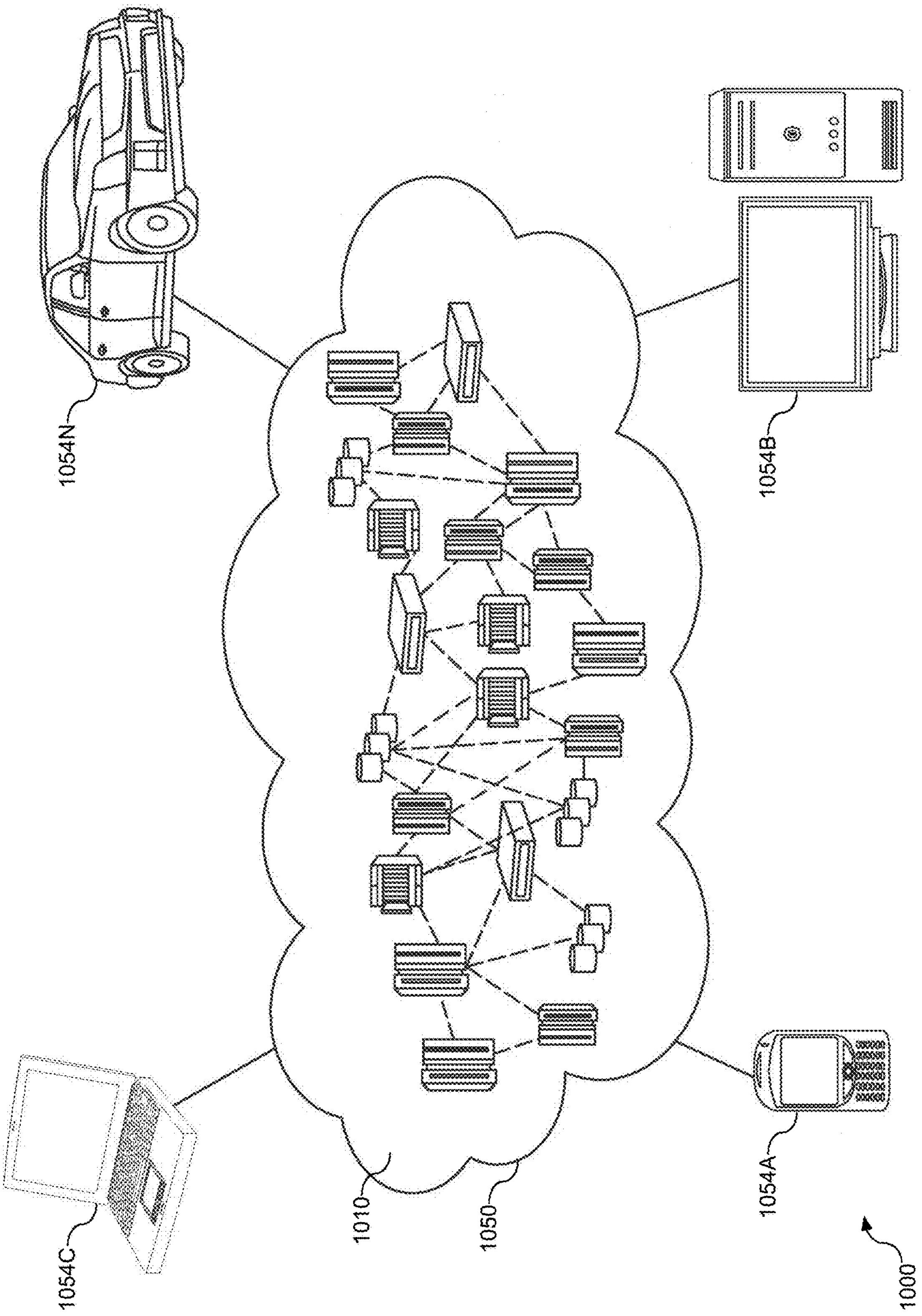
FIG. 10 depicts a block diagram illustrating a cloud computer environment.

Referring now to FIG. 10, an illustrative cloud computing network (1000). As shown, cloud computing network (1000) includes a cloud computing environment (1050) having one or more cloud computing nodes (1010) with which local computing devices used by cloud consumers may communicate. Examples of these local computing devices include, but are not limited to, personal digital assistant (PDA) or cellular telephone (1054A), desktop computer (1054B), laptop computer (1054C), and/or automobile computer system (1054N). Individual nodes within nodes (1010) may further communicate with one another. They may be grouped (not shown) physically or virtually, in one or more networks, such as Private, Community, Public, or Hybrid clouds as described hereinabove, or a combination thereof. This allows cloud computing environment (1000) to offer infrastructure, platforms and/or software as services for which a cloud consumer does not need to maintain resources on a local computing device. It is understood that the types of computing devices (1054A-N) shown in FIG. 10 are intended to be illustrative only and that the cloud computing environment (1050) can communicate with any type of computerized device over any type of network and/or network addressable connection (e.g., using a web browser).

Figure 11:
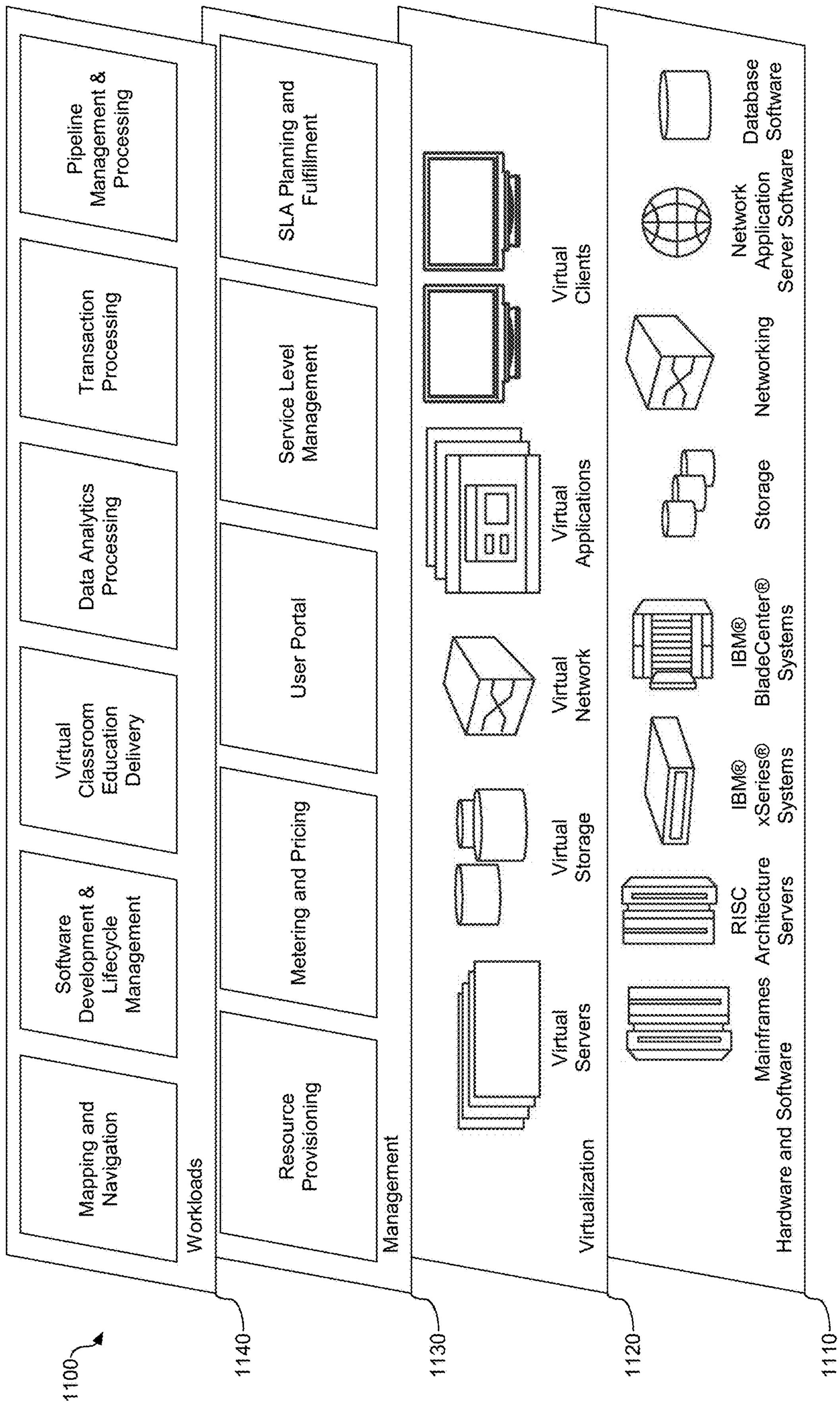
FIG. 11 depicts a block diagram illustrating a set of functional abstraction model layers provided by the cloud computing environment.

Referring now to FIG. 11, a set of functional abstraction layers (1100) provided by the cloud computing network of FIG. 10 is shown. It should be understood in advance that the components, layers, and functions shown in FIG. 11 are intended to be illustrative only, and the embodiments are not limited thereto. As depicted, the following layers and corresponding functions are provided: hardware and software layer (1110), virtualization layer (1120), management layer (1130), and workload layer (1140). The hardware and software layer (1110) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (1120) provides an abstraction layer from which the following examples of virtual entities may be provided: virtual servers; virtual storage; virtual networks, including virtual private networks; virtual applications and operating systems; and virtual clients.

In one example, management layer (1130) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides prearrangement for, and procurement of, cloud computing resources for which a future requirement is anticipated in accordance with an SLA.

Workloads layer (1140) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and pipeline management and processing.

The system and flow charts shown herein may also be in the form of a computer program device for entity linking in a logical neural network. The device has program code embodied therewith. The program code is executable by a processing unit to support the described functionality.

While particular embodiments have been shown and described, it will be obvious to those skilled in the art that, based upon the teachings herein, changes and modifications may be made without departing from its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to the embodiments containing only one such element, even when the same claim includes the introductory phrases "one or more" or "at least one" and indefinite articles such as "a" or "an"; the same holds true for the use in the claims of definite articles.

The present embodiment(s) may be a system, a method, and/or a computer program product. In addition, selected aspects of the present embodiment(s) may take the form of an entirely hardware embodiment, an entirely software embodiment (including firmware, resident software, microcode, etc.) or an embodiment combining software and/or hardware aspects that may all generally be referred to herein as a "circuit," "module" or "system." Furthermore, aspects of the present embodiment(s) may take the form of computer program product embodied in a computer readable storage medium (or media) having computer readable program instructions thereon for causing a processor to carry out aspects of the present embodiment(s). Thus embodied, the disclosed system, a method, and/or a computer program product are operative to improve the functionality and operation of dynamical orchestration of a pre-requisite driven codified infrastructure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiment(s) may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiment(s).

Aspects of the present embodiment(s) are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiment(s). In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiment(s). In particular, the pipeline processing and execution may be carried out by different computing platforms or across multiple devices. Furthermore, the libraries may be localized, remote, or spread across multiple systems. Accordingly, the scope of protection of the embodiment(s) is limited only by the following claims and their equivalents.

What is claimed is:

1. A computer system comprising:

a processor operatively coupled to memory; and an artificial intelligence (AI) program, operatively coupled to the processor, comprising:

a processing manager configured to pre-process a pipeline represented in a data flow graph (DFG), including:

annotate a selection of nodes with two or more operational semantics comprising at least an input combination, a firing combination, and a state; and selectively annotate one or more of the nodes represented in the DFG with a lineage semantic comprising a lineage annotation configured to selectively combine objects or object references that trace lineage to a common input object; and a director configured to:

execute the pre-processed pipeline as represented in the annotated DFG with one or more training data sets, the executed pipeline configured to concurrently train a plurality of machine learning (ML) models;

leverage the lineage semantic to associate each trained ML model to a training data set of the one or more training data sets and a corresponding testing data set, and apply the testing data sets to a corresponding trained ML model, wherein the application configured to generate ML model performance data; and selectively identify and execute one or more of the plurality of trained ML models based on the generated ML model performance data.

2. The computer system of claim 1, further comprising the director configured to dynamically configure a control signal based on output from the selectively executed one or more trained ML models, and director further configured to issue the control signal to an operatively coupled physical hardware device, a process controlled by software, or a combination thereof, the control signal configured to selectively control a physical state of the operatively coupled device, the software, or a combination thereof.

3. The computer system of claim 1, further comprising a pipeline manager operatively coupled to the processing manager, the pipeline manager configured to represent the individual nodes in the DFG as an instance of a mathematical operation and individual edges as an object or an object reference.

4. The computer system of claim 1, wherein the processing manager is configured to annotate a selection of one or more nodes represented in the DFG with a secondary annotation configured to dictate an order to train the plurality of ML models.

5. The computer system of claim 4, wherein the secondary annotation is a depth first search configured to minimize time to produce a first trained ML model.

6. The computer system of claim 4, wherein the secondary annotation is a breadth first search configured to minimize memory footprint to produce the plurality of trained ML models.

7. The computer system of claim 4, wherein the secondary annotation is an early termination factor based on homogeneity of the plurality of machine learning models produced during training.

8. A computer program product configured to interface with a computer readable storage medium having program code embodied therewith, the program code executable by a processor to:

pre-process a pipeline represented in a data flow graph (DFG), including:

annotate a selection of nodes with two or more operational semantics comprising at least an input combination, a firing combination, and a state; and selectively annotate one or more of the nodes represented in the DFG with a lineage semantic comprising a lineage annotation configured to selectively combine objects or object references that trace lineage to a common input object; and execute the pre-processed pipeline as represented in the annotated DFG with one or more training data sets, including concurrently train a plurality of machine learning (ML) models;

leverage the lineage semantic to associate each trained ML model to a training data set of the one or more training data sets and a corresponding testing data set and apply the testing data set to a corresponding trained ML model, wherein the application is configured to generate ML model performance data; and selectively identify and execute one or more of the trained ML models based on the generated ML model performance data.

9. The computer program product of claim 8, further comprising program code configured to dynamically configure a control signal based on output from the selectively executed one or more trained ML models, and further configured to issue the control signal to an operatively coupled physical hardware device, a process controlled by software, or a combination thereof, the control signal configured to selectively control a physical state of the operatively coupled device, the software, or a combination thereof.

10. The computer program product of claim 8, further comprising program code configured to represent the individual nodes of the DFG as an instance of a mathematical operation and individual edges as an object or an object reference.

11. The computer program product of claim 8, further comprising program code configured to annotate a selection of one or more nodes represented in the DFG with a secondary annotation configured to dictate an order to train the plurality of ML models.

12. The computer program product of claim 11 wherein the secondary annotation is a depth first search configured to minimize time to produce a first trained ML model.

13. The computer program product of claim 11, wherein the secondary annotation is a breadth first search configured to minimize memory footprint to produce the plurality of trained ML models.

14. The computer program product of claim 11, wherein the secondary annotation is an early termination factor based on homogeneity of the plurality of the trained ML models.

15. A computer implemented method comprising:

pre-processing a pipeline in a data flow graph (DFG), including:

annotating a selection of the nodes with two or more operational semantics comprising at least an input combination, a firing combination, and a state; and selectively annotating one or more of the nodes represented in the DFG with a lineage semantic comprising a lineage annotation, the lineage semantic configured to selectively combine objects or object references that trace lineage to a common input object; and executing the pre-processed pipeline as represented in the annotated DFG with one or more training data sets, including concurrently training a plurality of machine learning (ML) models;

responsive to the selectively annotated lineage semantic, identifying the lineage semantic annotation to associate leach trained ML model to a training data set of the one or more training data sets and a corresponding testing data set;

applying the associated testing data set to the corresponding trained ML models, wherein the application is configured to generate ML model performance data; and selectively identifying one or more of the plurality of trained ML models based on the generated ML model performance data, including selectively executing the selectively identified one or more ML models.

16. The computer implemented method of claim 15, further comprising dynamically configuring a control signal, the control signal configuration based on output from the selectively executed one of more ML models, and issuing the configured control signal to an operatively coupled physical hardware device, a process controlled by software, or a combination thereof, the control signal configured to selectively control a physical state of the operatively coupled device, the software, or a combination thereof.

17. The computer implemented method of claim 15, wherein pre-processing the pipeline includes annotating a selection of the nodes represented in the DFG with a secondary annotation configured to dictate an order for training the plurality of ML models.

18. The computer implemented method of claim 17, wherein the secondary annotation is a depth first search configured to minimize time to produce a first trained ML model.

19. The computer implemented method of claim 17, wherein the secondary annotation is a breadth first search configured to minimize memory footprint for producing the plurality of machine learning models during training.

20. The computer implemented method of claim 17, wherein the secondary annotation is an early termination factor based on homogeneity of the plurality of trained ML models.

21. A computer implemented method comprising:

pre-processing a pipeline represented in a data flow graph (DFG), including:

annotating a selection of nodes with two or more operational semantics comprising at least an input combination, a firing combination, and a state; and selectively annotating one or more of the nodes represented in the DFG with a lineage semantic comprising a lineage annotation configured to selectively combine objects or object references that trace lineage to a common input object; and executing the pre-processed pipeline as represented in the annotated DFG with one or more training data sets, the executed pipeline configured to concurrently train a plurality of machine learning (ML) models;

leveraging the lineage semantic to associate each trained ML model to a training data set of the one or more training data sets and a corresponding testing data set, and applying the testing data set to a corresponding trained ML model, wherein the testing data set application is configured to generate ML model performance data; and selectively identifying and executing one or more of the plurality of trained ML models based on the generated ML model performance data.

22. The computer implemented method of claim 21, wherein pre-processing the pipeline includes annotating a selection of the nodes represented in the DFG with a secondary annotation configured to dictate an order for training the plurality of ML models.

* * * * *